United States Patent
Elshafie et al.

(10) Patent No.: US 12,047,944 B2
(45) Date of Patent: Jul. 23, 2024

(54) PARTIAL PUSCH REPETITION CONFIGURATION

(71) Applicant: QUALCOMM Incorporated, San Diego, CA (US)

(72) Inventors: Ahmed Elshafie, San Diego, CA (US); Yi Huang, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/452,897

(22) Filed: Oct. 29, 2021

(65) Prior Publication Data

US 2023/0140036 A1    May 4, 2023

(51) Int. Cl.
| | |
|---|---|
| *H04W 72/12* | (2023.01) |
| *H04L 1/1812* | (2023.01) |
| *H04L 5/00* | (2006.01) |
| *H04W 72/0446* | (2023.01) |
| *H04W 72/1268* | (2023.01) |
| *H04W 72/23* | (2023.01) |
| *H04W 72/54* | (2023.01) |

(52) U.S. Cl.
CPC ....... *H04W 72/1268* (2013.01); *H04L 1/1812* (2013.01); *H04L 5/0051* (2013.01); *H04L 5/0053* (2013.01); *H04W 72/0446* (2013.01); *H04W 72/23* (2023.01); *H04W 72/54* (2023.01)

(58) Field of Classification Search
CPC ......... H04W 72/1268; H04W 72/0446; H04W 72/23; H04W 72/54; H04L 1/1812; H04L 5/0051; H04L 5/0053
See application file for complete search history.

(56) References Cited

U.S. PATENT DOCUMENTS

| | | | |
|---|---|---|---|
| 2019/0327759 A1* | 10/2019 | Lee | H04W 72/1268 |
| 2021/0144743 A1* | 5/2021 | Rastegardoost | H04W 72/23 |
| 2021/0377981 A1* | 12/2021 | Li | H04L 5/0044 |
| 2022/0104254 A1* | 3/2022 | Matsumura | H04W 74/0808 |

* cited by examiner

*Primary Examiner* — Jamal Javaid
(74) *Attorney, Agent, or Firm* — Procopio, Cory, Hargreaves & Savitch

(57) ABSTRACT

A base station may transmit, to a user equipment (UE), an instruction for scheduling a physical uplink shared channel (PUSCH) transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The UE may schedule the second partial PUSCH based on the instruction received from the base station.

30 Claims, 14 Drawing Sheets

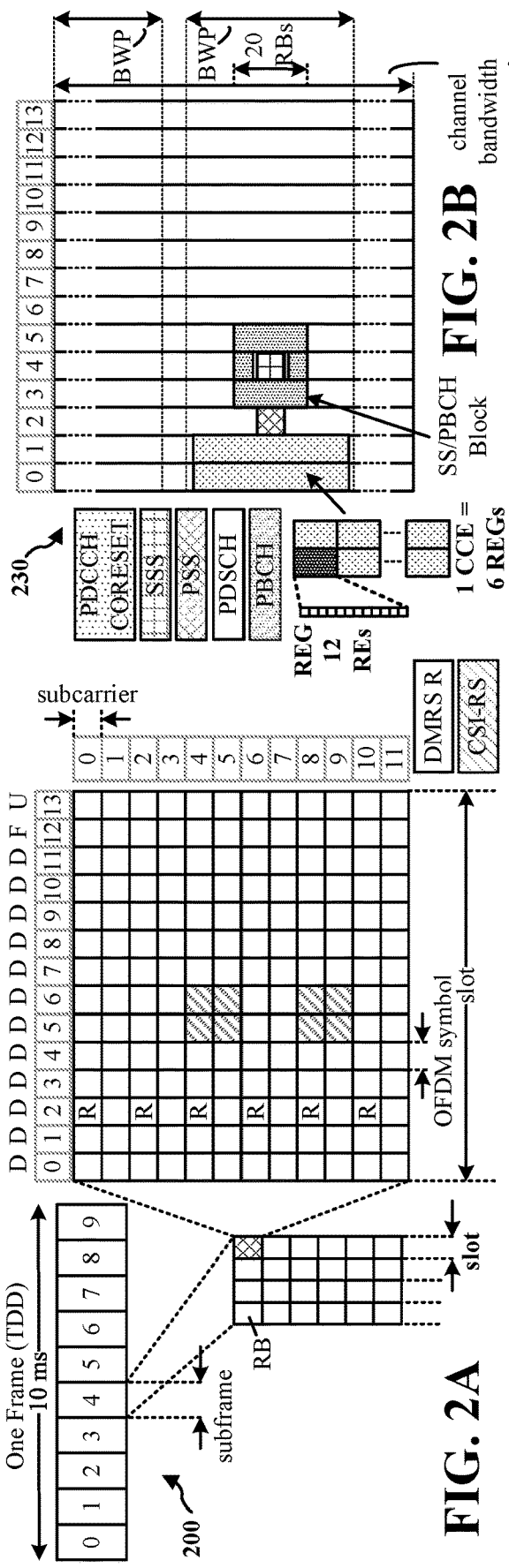
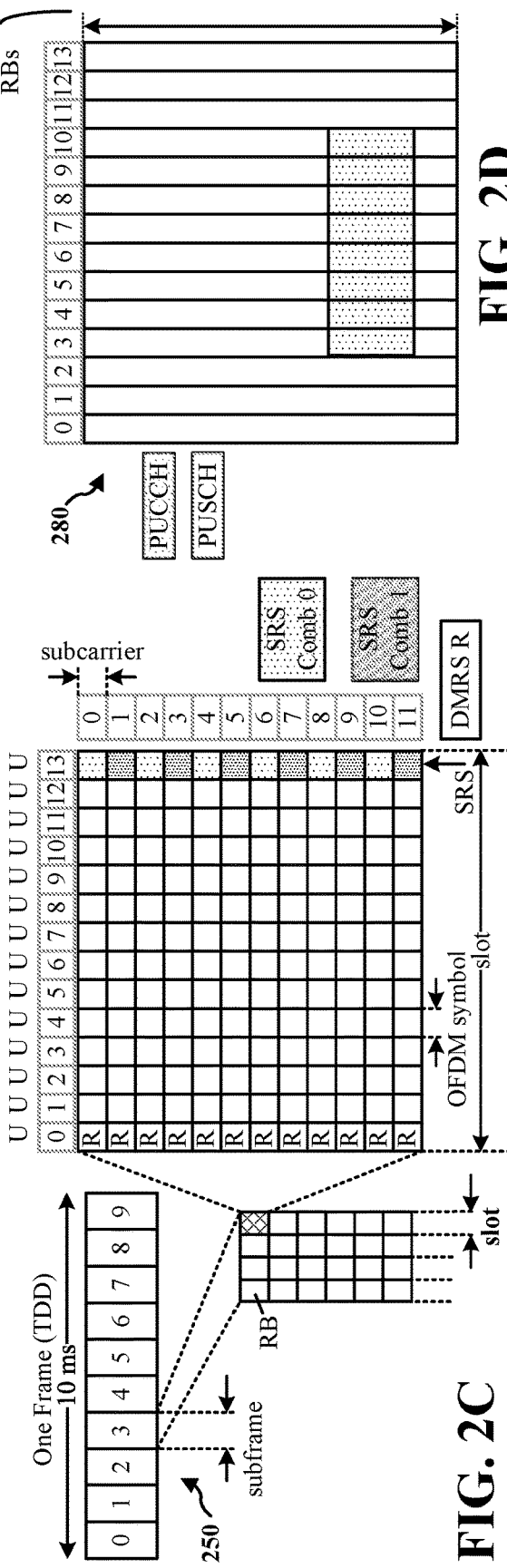
FIG. 2A  FIG. 2B  FIG. 2C  FIG. 2D

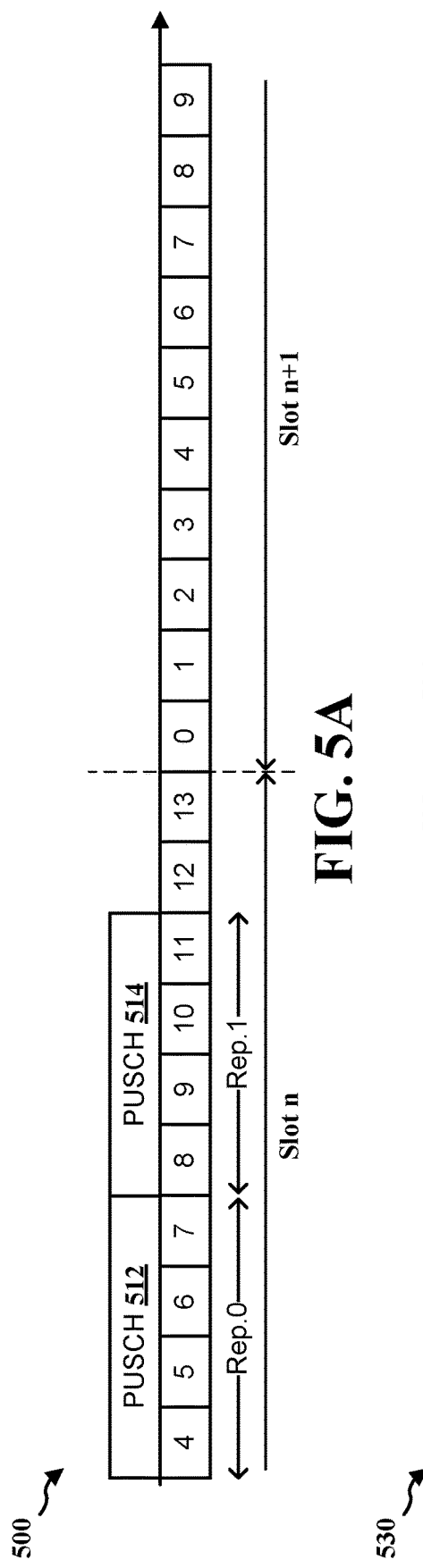
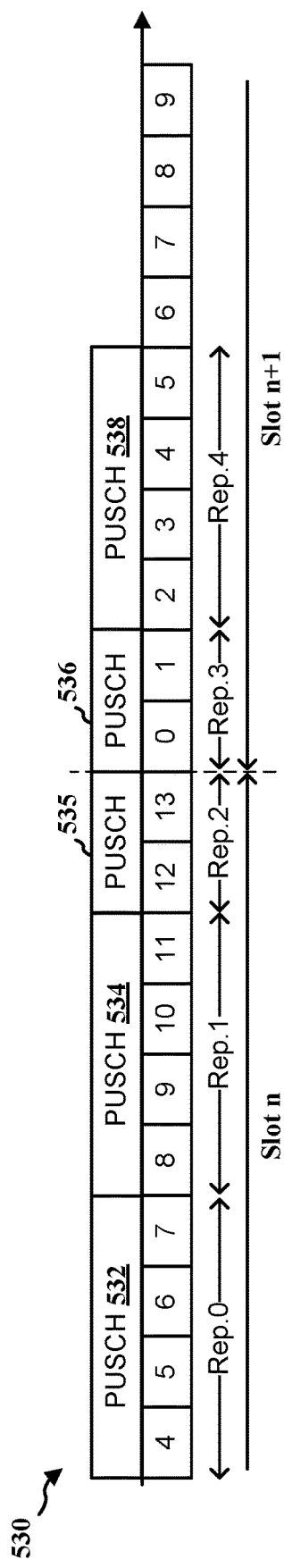
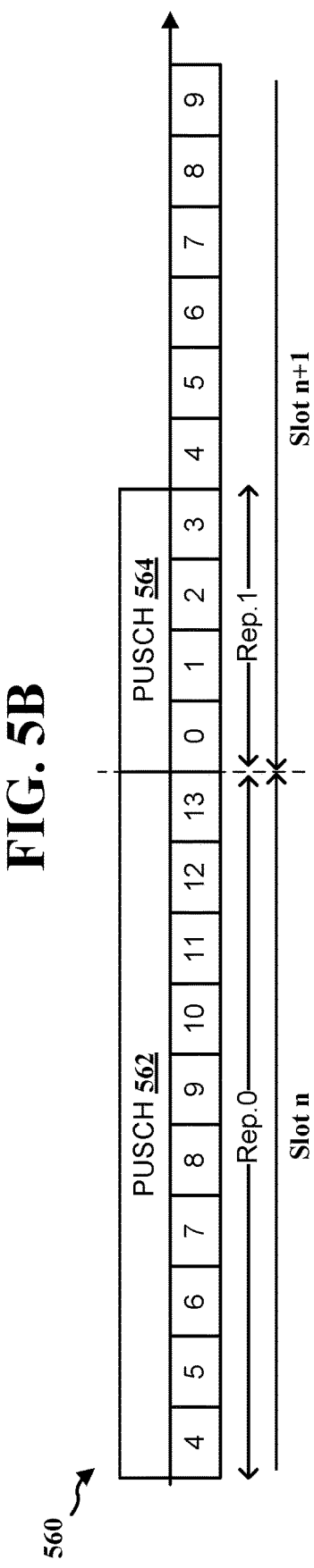
FIG. 5A
FIG. 5B
FIG. 5C

PARTIAL PUSCH REPETITION CONFIGURATION

TECHNICAL FIELD

The present disclosure relates generally to communication systems, and more particularly, to a method of wireless communication including a configuration of a partial physical uplink shared channel (PUSCH) repetition.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may transmit, to a UE, an instruction for scheduling a physical uplink shared channel (PUSCH) transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The UE may schedule the second partial PUSCH based on the instruction received from the base station. The second partial PUSCH within a demodulation reference signal (DMRS) bundle may be scheduled for transmission and second partial PUSCH not within the DMRS bundle may be candled. The second partial PUSCH may be scheduled to include uplink control information (UCI) including one or more feedback information. The second partial PUSCH may include a DMRS or be include the UCI multiplexed with a DMRS. The second partial PUSCH may be encoded using a sequence-based encoding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 5A, 5B, and 5C are examples of PUSCH repetitions of a method of wireless communication.

DETAILED DESCRIPTION

Figure 1:
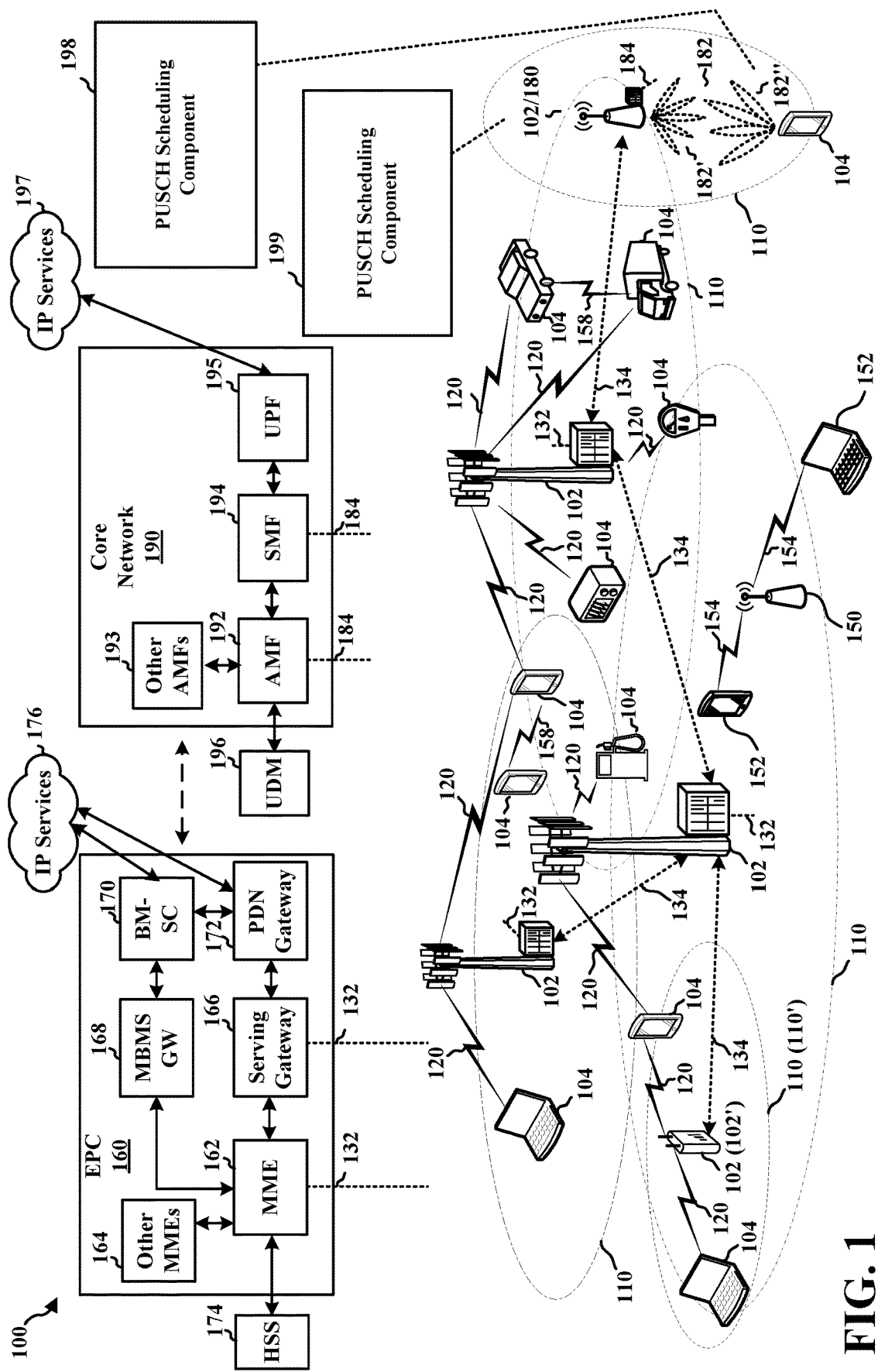
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PUSCH scheduling component 198 configured to receive, from a base station, an instruction for scheduling a PUSCH transmission, configure a first partial PUSCH and a second partial PUSCH, the second partial PUSCH being a subset of the PUSCH transmission and including a single symbol length, the PUSCH transmission overlapping with at least one of a slot boundary or a symbol that is configured invalid for a PUSCH by the base station, and schedule the second partial PUSCH based on the instruction received from the base station. In certain aspects, the base station 180 may include a PUSCH scheduling component 199 configured to transmit, to a UE, an instruction for scheduling a PUSCH transmission, and receive, from the UE, at least one of a first partial PUSCH and a second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as R for one particular configuration, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DMRS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
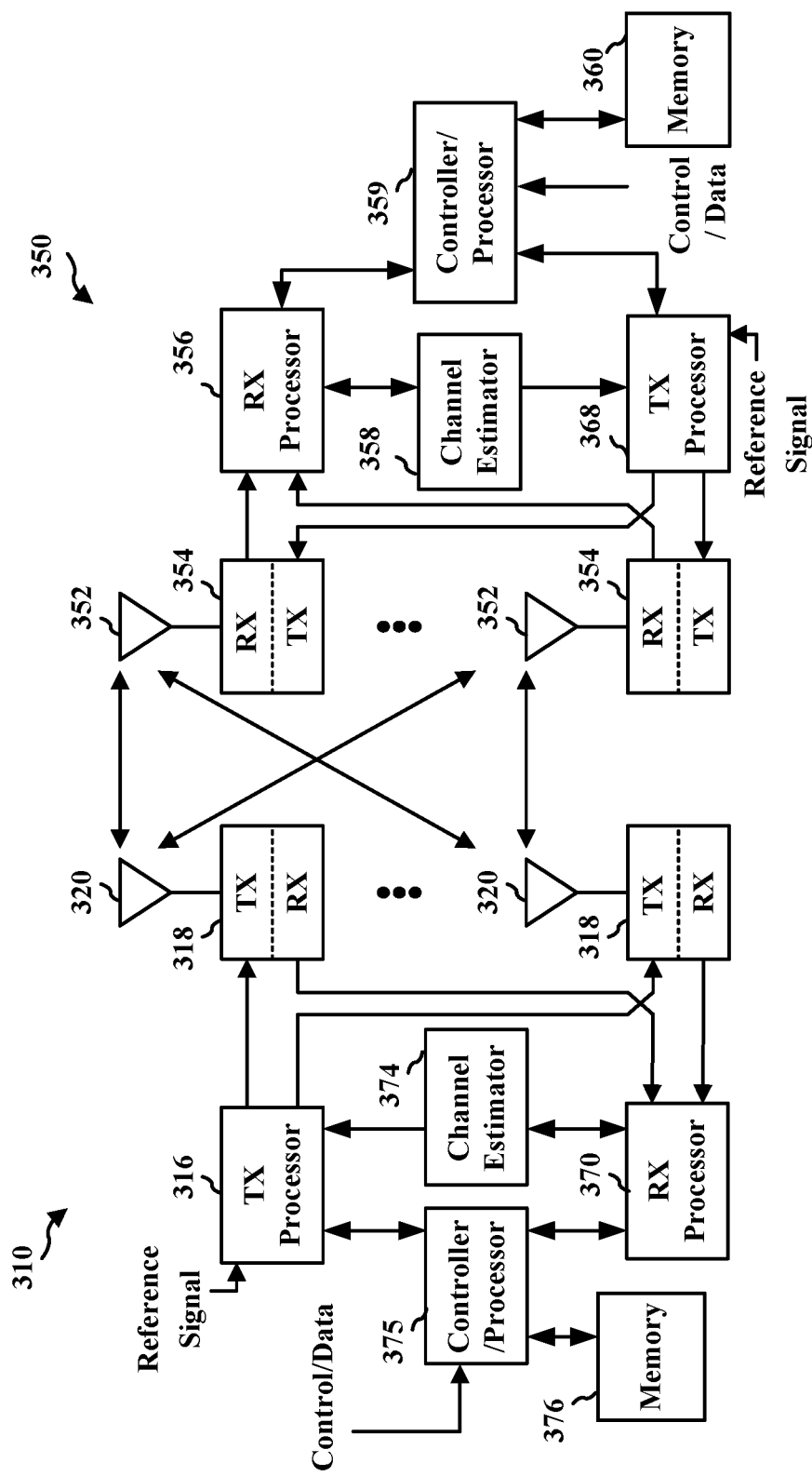
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical al channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects of wireless communications, a base station may transmit a grant to a UE to configure a repetition of uplink (UL) transmissions. The UE may receive a grant of the repetition of UL transmissions from the base station, and transmit a plurality of UL repetitions to the base station based on the grant received from the base station. The plurality of UL repetitions may include a plurality of physical uplink shared channel (PUSCH) repetitions or a plurality of physical uplink control channel (PUCCH) repetitions.

Figure 4A:
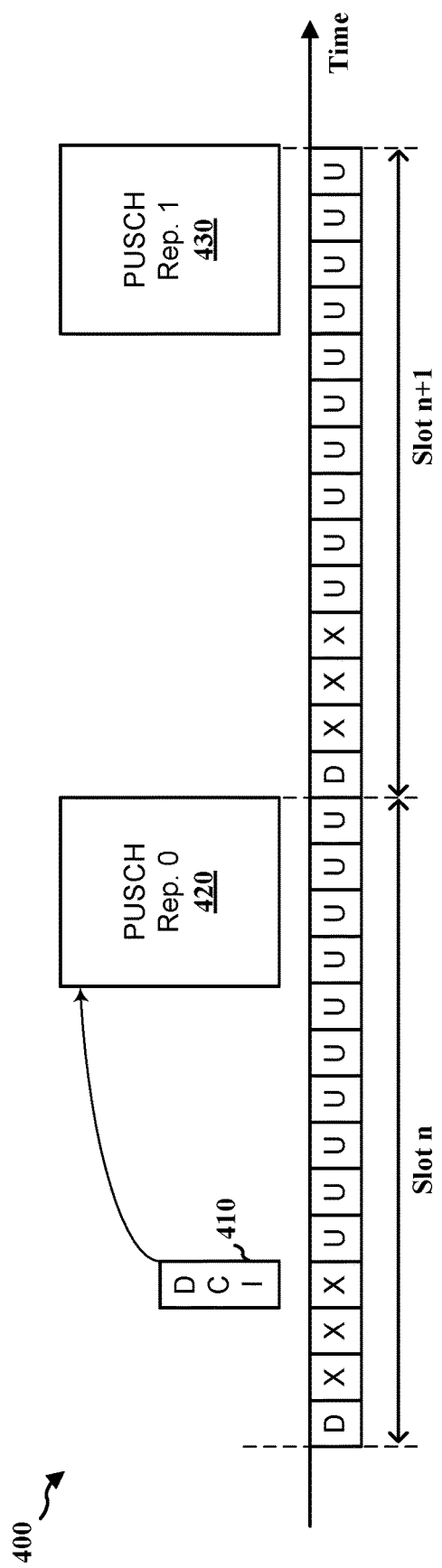
FIGS. 4A and 4B are examples of physical uplink shared channel (PUSCH) repetitions of a method of wireless communication.
Figure 4B:
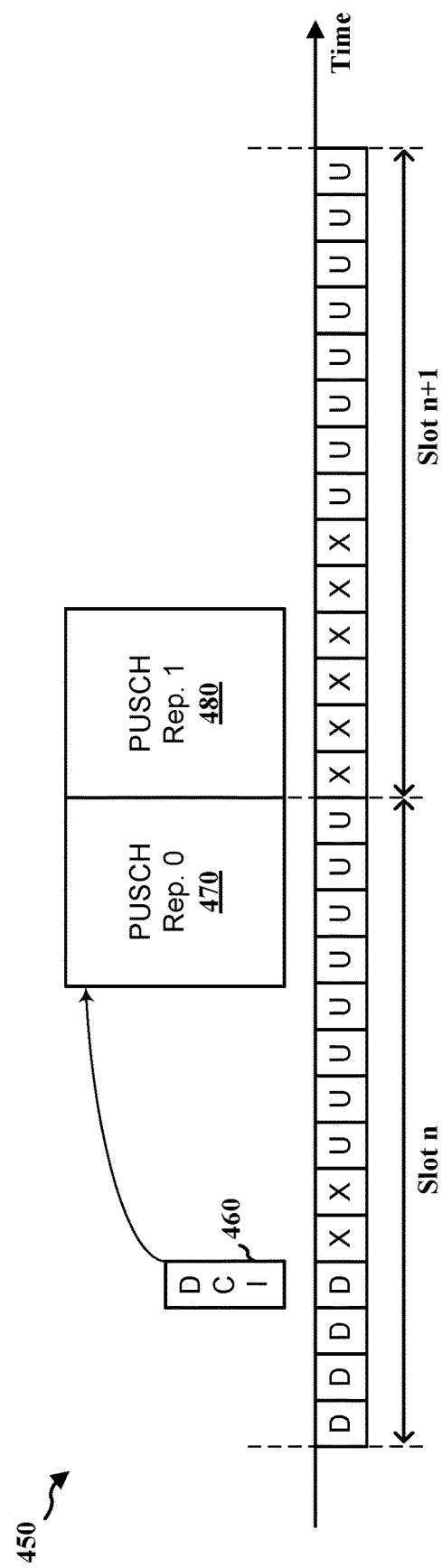

FIGS. 4A and 4B are examples 400 and 450 of physical uplink shared channel (PUSCH) repetitions of a method of wireless communication. In some aspects, two types of UL repetitions (e.g., PUSCH repetitions) may be defined. The first example 400 may represent a first type (Type-A) of UL repetition. The first type of UL repetition may not provide any optimization other than the number of repetitions that may be indicated dynamically. In one aspect, the number of repetitions K may be greater than 1, and the same start and length value (SLIV) may be applied across K consecutive slots.

The first example 400 may include first DCI 410 indicating a grant for the UE to schedule the plurality of UL repetitions. For example, the first DCI 410 may include the grant for the UE to schedule a first PUSCH 420 and a second PUSCH 430. Here, the first PUSCH 420 may be the first PUSCH repetition, and the second PUSCH 430 may be the second PUSCH repetition.

The first DCI 410 may indicate one or more parameters including L=4, K=2, and S=10, where L may refer to the length of each of the UL repetitions, K may refer to the number of repetitions, and S may refer to the starting symbol of the slot. Accordingly, the first example 400 may provide that the first PUSCH 420 is scheduled from the $11^{th}$ symbol to the $14^{th}$ symbol of slot n, and the second PUSCH 430 is scheduled from the $11^{th}$ symbol to the $14^{th}$ symbol of slot n+1. The four (4) symbols from the $11^{th}$ symbol to the $14^{th}$ symbol of slot n may be configured for the uplink transmission, and the four (4) symbols from the $11^{th}$ symbol to the $14^{th}$ symbol of slot n+1 may be configured for the uplink transmission, and therefore, the UE may successfully schedule the first PUSCH 420 and the second PUSCH 430.

The second example 450 may represent a second type (Type-B) of UL repetition. The second type of UL repetition may provide the UL repetition grant that may be within or across slots (i.e., intro/inter slots), crossing the slot boundary, a dynamic indication of the number of repetitions, inter-nominal PUSCH frequency hopping, new uplink/downlink (U/D) symbol interaction, new SLIV, etc. For example, the plurality of PUSCH repetitions configured with K number of repetitions, with the nominal length of L, may be transmitted back-to-back starting from the symbol S, where S and L are given by the SLIV.

The second example 450 may include second DCI 460 indicating a grant for the UE to schedule the plurality of UL repetitions. For example, the second DCI 460 may include the grant for the UE to schedule a third PUSCH 470 and a fourth PUSCH 480. Here, the third PUSCH 470 may be the first PUSCH repetition, and the fourth PUSCH 480 may be the second PUSCH repetition.

The second DCI 460 may indicate the parameters including L=4, K=2, and S=10, where L may refer to the length of each of the UL repetitions, K may refer to the number of repetitions, and S may refer to the starting symbol of the slot. Accordingly, the second example 450 may provide that the third PUSCH 470 and the fourth PUSCH 480 are continuously scheduled in 8 symbols from the $11^{th}$ symbol of slot n to the $4^{th}$ symbol of slot n+1. The absolute length of the PUSCH repetitions may be calculated as K*L=8 symbols. The eight (8) symbols from the $11^{th}$ symbol of the slot n to the $4^{th}$ symbol of slot n+1 may be configured for the uplink transmissions, and the third PUSCH 470 and the fourth PUSCH 480 may not overlap with the slot boundary between the slot n and the slot n+1, and therefore, the UE may successfully schedule the third PUSCH 470 and the fourth PUSCH 480.

The second type of UL repetitions may include nominal UL repetitions and partial UL repetitions (or actual UL repetitions) that may be a subset of a nominal UL repetition of the nominal UL repetitions. That is, in some examples, some of the scheduled nominal UL transmissions may not be transmitted as a whole due to an overlapping slot boundary or DL interruption, and the nominal UL repetition may be broken into one or multiple partial UL repetitions. The subset of the nominal UL repetition may not include all of the nominal UL repetition. For instance, the length of the subset of the nominal UL repetition may be less than the length of the nominal UL repetition. Further, the subset of the nominal UL repetition may have a smaller symbol length than the nominal UL repetition. Accordingly, a subset of a parent set may include less than all of the parent set. At least one nominal UL repetition may overlap with a slot border or a DL interruption, and the nominal UL repetition may be segmented. That is, the nominal UL repetition may be segmented into one or more partial UL repetitions around the slot border or the semi-static DL symbols. The UE may also be configured with an invalid symbol pattern (e.g., InvalidSymbolPattern), and the UE may schedule the partial UL repetition around the invalid symbol pattern. For example, the invalid symbol pattern may be a symbol level bitmap indicating that the corresponding symbol is an invalid symbol for a second type PUSCH repetition transmission.

In one aspect, one nominal PUSCH repetition of the plurality of PUSCH repetitions may overlap with the slot boundary, and the overlapping nominal PUSCH repetition may be broken into two partial PUSCH repetitions. In another aspect, one nominal PUSCH repetition of the plurality of PUSCH repetitions may overlap with symbols configured for DL transmissions (e.g., a DL interruption), and a subset of the nominal PUSCH repetition scheduled on symbols configured for UL transmissions may be transmitted as the partial PUSCH repetition.

FIGS. 5A, 5B, and 5C are examples 500, 530, and 560 of PUSCH repetitions of a method of wireless communication. The first example 500, the second example 530, and the third example 560 are examples of the second type of the UL repetition (e.g., FIG. 4B).

The first example 500 depicts the PUSCH repetition grant with parameters S=4, L=4, and K=2. The first example 500 illustrates that a first nominal PUSCH repetition 512 may be scheduled on symbols 4, 5, 6, and 7 of slot n, and a second nominal PUSCH repetition 514 may be scheduled on symbols 8, 9, 10, and 11 of the slot n. Since both the first nominal PUSCH repetition 512 and the second nominal PUSCH repetition 514 do not overlap with the slot boundary, the UE may schedule the first nominal PUSCH repetition 512 and the second nominal PUSCH 514 and transmit the first nominal PUSCH repetition 512 and the second nominal PUSCH 514 as scheduled.

The second example 530 depicts the PUSCH repetition grant with parameters S=4, L=4, and K=4. The second example 530 illustrates that a first nominal PUSCH repetition 532 may be scheduled on symbols 4, 5, 6, and 7 of slot n, a second nominal PUSCH repetition 534 may be scheduled on symbols 8, 9, 10, and 11 of the slot n, and a fourth nominal PUSCH repetition 538 may be scheduled on symbols 2, 3, 4, and 5 of slot n+1. Since the third nominal PUSCH repetition overlaps with the slot boundary between the slot n and the slot n+1, a first partial PUSCH repetition 535 may be scheduled on symbols 12 and 13 of slot n, and a second partial PUSCH repetition 536 may be scheduled on symbols 0 and 1 of slot n+1.

The third example 560 depicts the PUSCH repetition grant with parameters S=4, L=14, and K=1. Since a first nominal PUSCH repetition overlaps with the slot boundary between the slot n and the slot n+1, a first partial PUSCH repetition 562 may be scheduled on symbols 4, 5, 6, 7, 8, 9, 10, 11, 12, and 13 of slot n, and a second partial PUSCH repetition 564 may be scheduled on symbols 0, 1, 2, and 3 of slot n+1.

Figure 6:
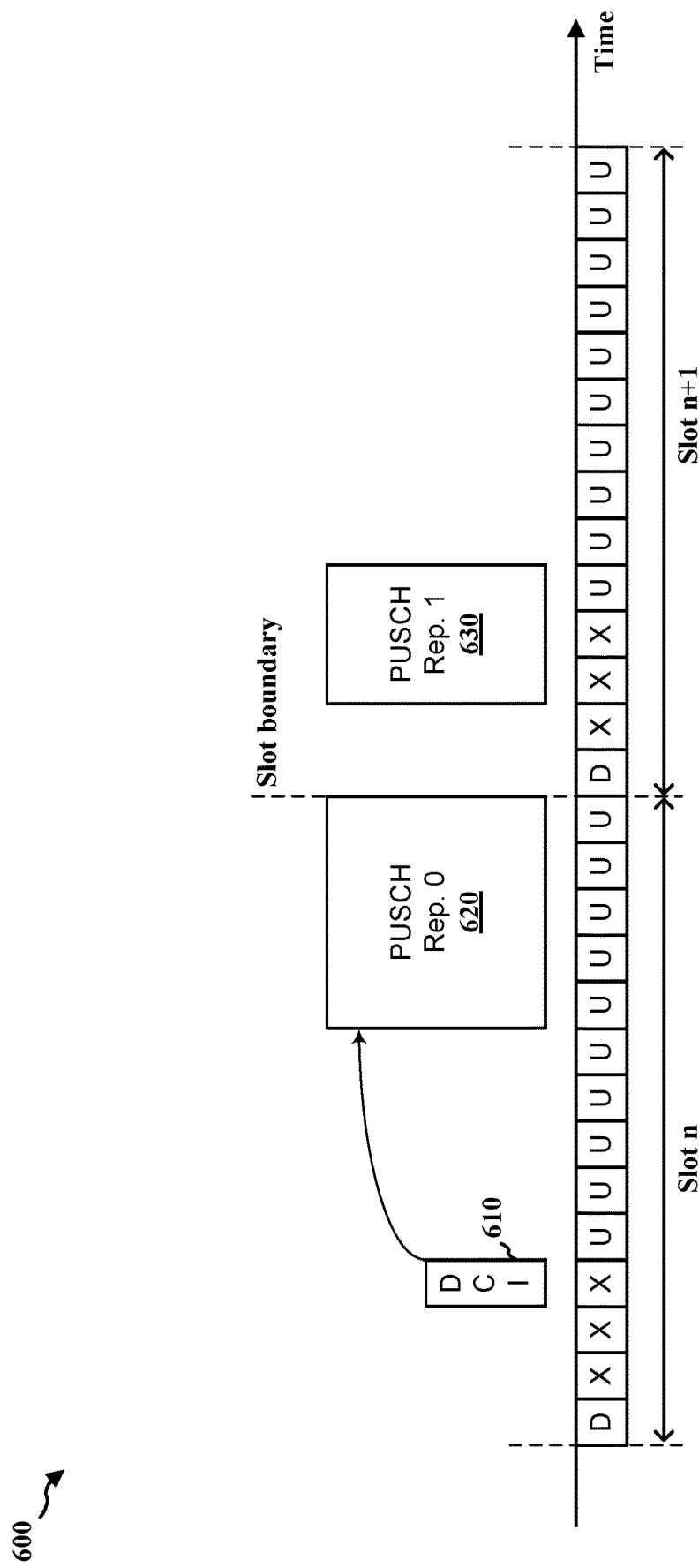
FIG. 6 is an example of PUSCH repetitions of a method of wireless communication.

FIG. 6 is an example 600 of PUSCH repetitions of a method of wireless communication. In one aspect, the nominal UL repetition may overlap with a DL interruption, and the nominal UL repetition interrupted by the DL symbols may be segmented. That is, one nominal PUSCH repetition of the plurality of PUSCH repetitions may overlap with symbols configured for DL transmissions (DL interruption), and a subset of the nominal PUSCH repetition scheduled on symbols configured for UL transmissions may be transmitted as the partial PUSCH repetition.

The example 600 includes the DCI 610 including a PUSCH repetition grant with parameters S=9, L=5, and K=2. The invalid symbol pattern may also indicate that symbol 1 of slot n+1 is an invalid symbol for the second type PUSCH repetition transmission. The example 600 illustrates that a first nominal PUSCH repetition 620 may be scheduled on symbols 9, 10, 11, 12, and 13 of slot n. Since the second nominal PUSCH repetition overlaps with the symbol 0 of slot n+1, which is configured for DL transmission, and the symbol 1 of slot n+1, which is configured invalid for the second type PUSCH repetition transmission, a first partial PUSCH repetition 630 may be configured for symbols 2, 3, and 4 of slot n+1.

Figure 7:
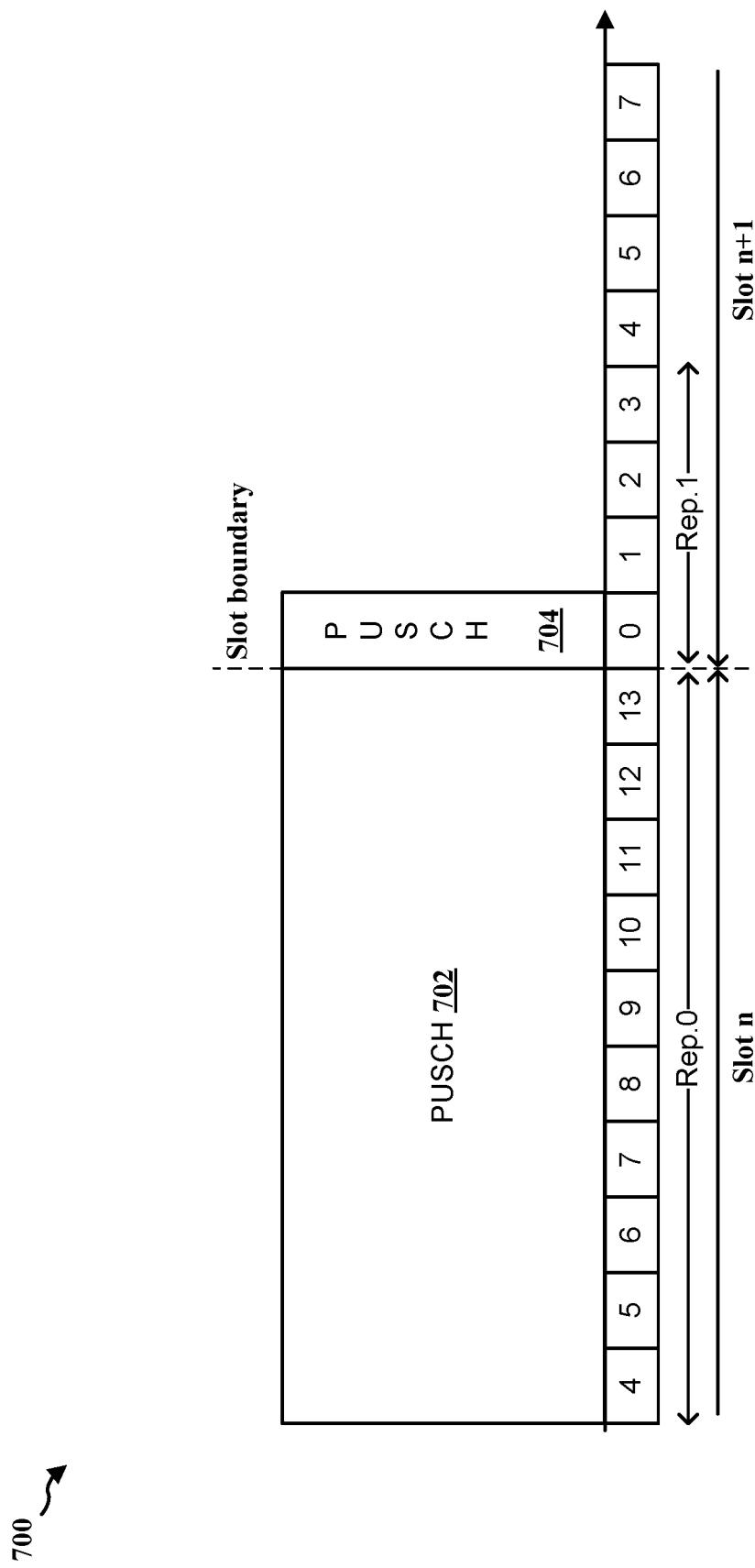
FIG. 7 is an example of PUSCH repetitions of a method of wireless communication.

FIG. 7 is an example 700 of a PUSCH of a method of wireless communication. Here, the PUSCH may be an example of the second type of the UL repetition (e.g., FIG. 4B). The example 700 provides the PUSCH repetition grant with parameters S=4, L=11, and K=1. Since a first nominal PUSCH repetition overlaps with the slot boundary between the slot n and the slot n+1, a first partial PUSCH repetition 702 may be scheduled on symbols 4, 5, 6, 7, 8, 9, 10, 11, 12, and 13 of slot n, and a second partial PUSCH repetition 704 may be scheduled on the symbol 0 of slot n+1. That is, the first nominal PUSCH repetition may be broken into the first partial PUSCH repetition 702 and the second partial PUSCH repetition 704 by the slot boundary between the slot n and the slot n+1, and the second partial PUSCH repetition 704 may be a subset of the first PUSCH repetition including a single symbol length. Accordingly, the second partial PUSCH repetition 704 may be a single-symbol PUSCH with a single symbol length.

In some aspects, the UE may be configured to drop or cancel the second partial PUSCH repetition 704 based on the second partial PUSCH having a single-symbol length. In case the second partial PUSCH repetition 704 does not include a DMRS, the base station may not decode the second partial PUSCH repetition 704 that does not include the DMRS even if the UE transmits the second partial PUSCH repetition 704. Therefore, the UE may be configured to cancel the second partial PUSCH repetition 704. However, canceling of the second partial PUSCH repetition 704 including the single-symbol length may be a waste of wireless communication resources. Accordingly, the UE may be configured cancel the second partial PUSCH repetition 704 based on identifying that the second partial PUSCH repetition 704 is not associated with a DMRS.

In one aspect, the UE may be configured to identify that the second partial PUSCH repetition 704 is associated with the DMRS. That is, the PUSCH repetition grant may configure at least one DMRS in the last symbol, and the second partial PUSCH repetition 704 may be configured to include the at least one DMRS. The UE may identify that the second partial PUSCH repetition 704 is within a DMRS bundle including the at least one DMRS, and schedule the second partial PUSCH repetition 704 as a DMRS symbol including the DMRS. The UE may transmit, to the base station, the second partial PUSCH repetition 704 including the DMRS.

In another aspect, the UE may be configured to identify that the second partial PUSCH repetition 704 is not associated with the DMRS. That is, the UE may identify that the second partial PUSCH repetition 704 is not within a DMRS bundle and does not include at least one DMRS, and the UE may determine to cancel the second partial PUSCH repetition 704.

In another aspect, the UE may be configured to use sequence-based encoding techniques that may not specify DMRS to encode the second partial PUSCH repetition 704 and transmit the second partial PUSCH repetition 704 to the base station. That is, the UE may be configured to encode the second partial PUSCH repetition 704 using an encoding scheme that does not rely on channel estimation, such as a sequence-based scheme. At the UE side, the UE may encode the second partial PUSCH repetition 704 using the sequence-based scheme when the second partial PUSCH repetition 704 does not have a DMRS signal. At the base station side, the base station may decode the second partial PUSCH repetition 704 that does not have a DMRS signal without the channel estimation or the DMRS.

In some aspects, the UE may be configured to use the second partial PUSCH repetition 704 to send feedback information to the base station. That is, the UE may transmit, to the base station, the feedback information including uplink control information (UCI) via the second partial PUSCH repetition 704. In one aspect, the UE may encode the second partial PUSCH repetition 704 using a sequence-based encoding based on a codebook. The UE may configure a number of physical resource blocks (PRBs) equal to the allocated number of resource blocks (RBs) for the PUSCH grant, and the PRBs may include a number of bits greater than 2. Since the second partial PUSCH repetition 704 including the UCI may be encoded using the sequence-based encoding, the second partial PUSCH repetition 704 may be free from DMRS overhead, and the base station may decode the second partial PUSCH repetition 704 based on the codebook without the DMRS.

The codebook that may be used for the sequence-base encoding and decoding may be agreed upon between the base station and the UE. In one aspect, the codebook for the sequence-base encoding and decoding may be specified in a specification. In another aspect, the base station may transmit a configuration of the codebook for the sequence-base encoding and decoding to the UE. The configuration may be transmitted via at least one of the RRC message, the MAC-CE, or the DCI.

In another aspect, the UE may multiplex, e.g., FDM, a DMRS with the UCI in the second partial PUSCH repetition 704. That is, The UE may configure a number of PRBs equal to the allocated number of RBs for the PUSCH grant, and embed UE-specific DMRS in the second partial PUSCH repetition 704 so that the base station may perform coherent detection.

In some aspects, the UCI in the second partial PUSCH repetition 704 may include various feedback information. That is, the UE may be configured to transmit, to the base station, the UCI in the second partial PUSCH repetition 704 including at least one of the DL CSI report, the UL CSI report, the request to schedule an UL data transmission, the HARQ-ACK of canceled bits in deferred SPS, or the SRS for the base station to estimate an associated UL channel.

In one aspect, the UCI in the second partial PUSCH repetition 704 may include a downlink (DL) channel state information (CSI) report. The DL CSI report may include measurement data of DL channels including at least one of a block error rate (BLER), bit error rate (BER), channel quality indicator (CQI), channel ranks, etc. over a configured time. The UE may be configured to transmit one or more DL CSI reports to the base station. For example, the UE may be configured to include first number of best or worst DL CSI reports to the base station via the UCI in the second partial PUSCH repetition 704. The UE may receive at least one configuration from the base station indicating at least one of the measurement data of the DL channels included in the DL CSI report, or the first number of DL CSI reports included in the UCI. In one example, the at least one configuration may be received from the base station via an RRC message or a medium access control (MAC) control element (CE) (MAC-CE).

In another aspect, the UCI in the second partial PUSCH repetition 704 may also include an uplink (UL) CSI report. For example, the UL CSI may include a transmitted precoding matrix indicator (TPMI) indicating the precoding information and number of layers, and the base station may leverage or use the information to give feedback to the TPMI.

In another aspect, the UCI in the second partial PUSCH repetition 704 may include a sounding reference signal (SRS). That is, the UE may use the second partial PUSCH repetition 704 to transmit the SRS, and the base station may use the SRS received in the second partial PUSCH repetition 704 to determine the channel. The configuration of the SRS, e.g., comb level, offset, power allocation, etc., may be specified or received from the base station, e.g., a RRC message. The base station may transmit a change to the configuration via DCI.

In another aspect, the UCI in the second partial PUSCH repetition 704 may include a request to schedule an UL data transmission. That is, the UE may have data to send via the base station, and the UE may transmit the data via the second partial PUSCH repetition 704.

In another aspect, the UCI in the second partial PUSCH repetition 704 may include a hybrid automatic repeat request (HARQ) acknowledgement (ACK) (HARQ-ACK) of canceled bits in deferred semi-persistent scheduling (SPS). That is, in the SPS, a series of DL transmission may be configured via RRC messages and activated/deactivated by DCI, and the UE may be configured to transmit feedback, e.g., HARQ-ACK for the SPS DL transmissions. If the scheduled HARQ-ACK overlaps with other transmissions, the scheduled HARQ-ACK may be canceled and deferred to the subsequent UL transmission, and furthermore, the canceled bit may be accumulated to a set of canceled bits. The UE may be configured to transmit the HARQ-ACK of canceled bits in the deferred SPS in the second partial PUSCH repetition 704.

In another aspect, the UCI in the second partial PUSCH repetition 704 may include interference information. The interference information may include at least one of statistical information, power levels, interference covariance matrix rank and eigenvalues, etc. That is, the UE may use the second partial PUSCH repetition 704 to transmit the interference information to the base station.

In some aspects, for transmitting data in the second partial PUSCH repetition 704 including the one-symbol repetition, the UE may be configured to use a frequency-division multiplex (FDM) DMRS with data in case of a cyclic prefix (CP) orthogonal frequency division multiplexing (OFDM) (CP-OFDM), or use time-division multiplex (TDM) DMRS with data before DFT in case of discrete Fourier transform-spread-Orthogonal Frequency Division Multiplexing (DFT-s-OFDM).

The base station may transmit an instruction to the UE for scheduling the PUSCH transmission. That is, the instruction received from the base station may instruct the UE to schedule the second partial PUSCH repetition 704 based on the instruction. The instruction may be received via at least one of an RRC message, a MAC-CE, or DCI.

In one aspect, the instruction may indicate the UE to identify whether the second partial PUSCH repetition 704 is within a DMRS bundle, and cancel the second partial PUSCH repetition 704 based on identifying that the second partial PUSCH repetition 704 is not within a DMRS bundle. In another aspect, the instruction may indicate the UE to transmit data via the second partial PUSCH repetition 704 using the sequence-based encoding techniques regardless of whether the second partial PUSCH repetition 704 is within the DMRS bundle.

In some aspects, the instruction may indicate the UE to use the second partial PUSCH repetition 704 to send feedback information, e.g., UCI, to the base station. In one aspect, the instruction may configure the UE to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station to estimate an associated UL channel.

Figure 8:
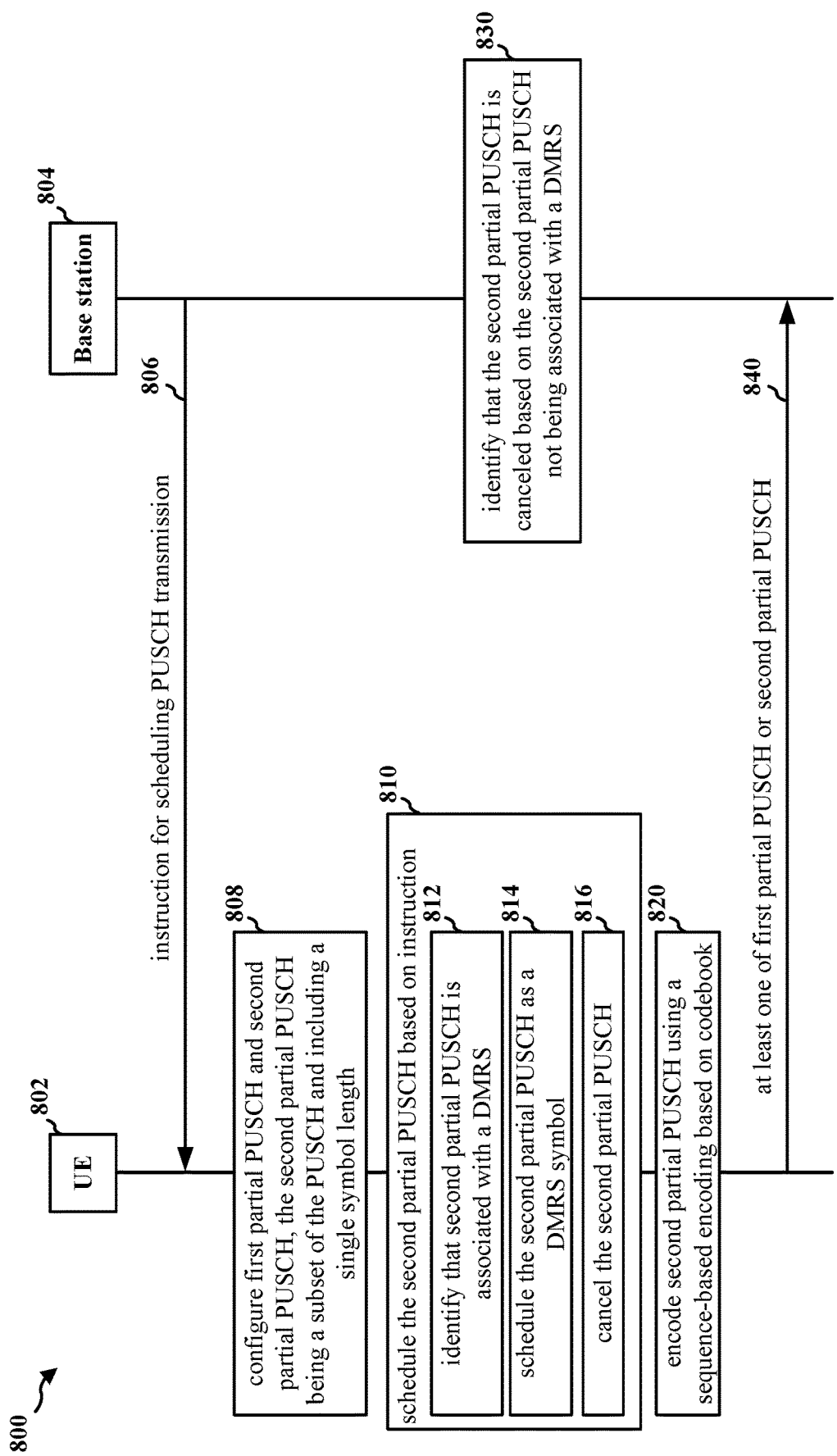
FIG. 8 is a call-flow diagram of a method of wireless communication.

FIG. 8 is a call-flow diagram 800 of a method of wireless communication. The call-flow diagram 800 may include a UE 802 and a base station 804. The base station 804 may transmit, to the UE 802, an instruction for scheduling a PUSCH transmission. The PUSCH transmission may be overlapping with at least one of a slot boundary or a symbol that is configured invalid for a PUSCH by the base station 804, and the UE 802 may configure a first partial PUSCH and a second partial PUSCH, the second partial PUSCH being a subset of the PUSCH transmission and including a single symbol length. The UE 802 may schedule the second partial PUSCH based on the instruction received from the base station 804.

At 806, the base station 804 may transmit, to the UE 802, an instruction for scheduling a PUSCH. The UE 802 may receive, from the base station 804, an instruction for scheduling a PUSCH. The PUSCH transmission may include one or more PUSCH repetitions. The instruction received from the base station 804 may instruct the UE 802 to schedule the second partial PUSCH based on the instruction. The instruction may be received via at least one of an RRC message, a MAC-CE, or DCI.

In one aspect, the instruction may indicate the UE 802 to identify whether the second partial PUSCH is within a DMRS bundle at 812, and cancel the second partial PUSCH based on identifying that the second partial PUSCH is not within a DMRS bundle at 816. In another aspect, the instruction may indicate the UE 802 to transmit data via the second partial PUSCH using the sequence-based encoding techniques regardless of whether the second partial PUSCH is within the DMRS bundle.

In another aspect, the instruction may indicate the UE 802 to use the second partial PUSCH to send feedback information, e.g., UCI, to the base station 804. In one aspect, the instruction may configure the UE 802 to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station 804 to estimate an associated UL channel.

At 808, the UE 802 may configure a first partial PUSCH and a second partial PUSCH, the second partial PUSCH being a subset of the PUSCH transmission and including a single symbol length, the PUSCH transmission overlapping with at least one of a slot boundary or a symbol that is configured invalid for a PUSCH by the base station 804.

At 810, the UE 802 may schedule the second partial PUSCH based on the instruction received from the base station 804. 810 may include 812, 814, and 816. At 812, the UE 802 may identify that the second partial PUSCH is associated with the DMRS. At 814, the UE 802 may schedule the second partial PUSCH as a DMRS symbol including the DMRS based on the identification that the second partial PUSCH is associated with the DMRS at 812. That is, the UE 802 may identify that the second partial PUSCH is within a DMRS bundle including at least one DMRS, the UE 802 may schedule the second partial PUSCH as a DMRS symbol including the DMRS. The UE 802 may transmit, to the base station 804, the second partial PUSCH including the DMRS at 840. The base station 804 may use the DMRS in the second partial PUSCH to estimate the channel.

At 816, the UE 802 may cancel the second partial PUSCH based on the identification that the second partial PUSCH not is associated with the DMRS at 812. That is, the UE 802 may identify that the second partial PUSCH is not within a DMRS bundle and does not include at least one DMRS, and the UE 802 may determine to cancel the second partial PUSCH. The base station 804 may identify that the second partial PUSCH is canceled based on the second partial PUSCH not being associated with a DMRS at 830.

In some aspects, the second partial PUSCH may include at least one feedback information, and the second partial PUSCH may include a UCI. The configuration of the UCI may be received in the instruction received at 806. In one aspect, the second partial PUSCH including the UCI may be encoded using a sequence-based encoding based on a codebook. In another aspect, the UCI of the second partial PUSCH may be frequency-division multiplexed with a DMRS for the base station 804 to perform a phase coherent detection.

The UCI may include at least one of a DL CSI report, an UL CSI report, a request to schedule an UL data transmission, a HARQ-ACK of canceled bits in deferred SPS, or a SRS for the base station 804 to estimate an associated UL channel. In one aspect, the UCI may include one or more DL CSI report, which may include measurement data of DL channels including at least one of a BLER, BER, CQI, channel ranks, etc. over a configured time. In another aspect, the UCI may include one or more UL CSI report. In another aspect, the UCI may include an SRS. In another aspect, the UCI may include a request to schedule an UL data transmission for the UE 802. In another aspect, the UCI may include a HARQ-ACK of canceled bits in deferred semi-persistent scheduling (SPS). The UCI may further include various interference information such as statistical information, power levels, interference covariance matrix rank and eigenvalues, etc. In yet another aspect, the UCI may include a combination thereof.

In some aspects, the second partial PUSCH may include a DMRS, and the DMRS is one of an FDM DMRS for a CP-OFDM waveform or a TDM DMRS for a DFT-s-OFDM waveform. That is, for transmitting data in the second partial PUSCH including the one-symbol repetition, the UE 802 may be configured to use a FDM DMRS with data in case of a CP-OFDM, or use TDM DMRS with data before DFT in case of DFT-s-OFDM.

At 820, the UE 802 may encode the second partial PUSCH using a sequence-based encoding based on a codebook. That is, the second partial PUSCH may include data, and to transmit the data via the second partial PUSCH, the UE 802 may encode the second partial PUSCH using a sequence-based encoding based on a codebook to transmit the data via the second partial PUSCH at 840. At the UE side, the UE 802 may encode the second partial PUSCH using the sequence-based scheme when the second partial PUSCH does not have a DMRS signal. At the base station side, the base station 804 may decode the second partial PUSCH that does not have a DMRS signal without the channel estimation or the DMRS.

The codebook that may be used for the sequence-base encoding and decoding may be agreed upon between the base station 804 and the UE 802. In one aspect, the codebook for the sequence-base encoding and decoding may be specified in a specification. In another aspect, the base station 804 may transmit a configuration of the codebook for the sequence-base encoding and decoding to the UE 802. The configuration may be transmitted via at least one of the RRC message, the MAC-CE, or the DCI.

At 830, the base station 804 may identify that the second partial PUSCH is canceled based on the second partial PUSCH not being associated with a DMRS. That is, the base station 804 may identify that the second partial PUSCH is not within a DMRS bundle and does not include at least one DMRS, and the base station 804 may expect the UE 802, at 816, to cancel the second partial PUSCH that is not within the DMRS bundle and does not include at least one DMRS.

At 840, the UE 802 may transmit, to the base station 804, at least one of the first partial PUSCH or the second partial PUSCH. The base station 804 may receive at least one of the first partial PUSCH and the second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH.

In one aspect, the second partial PUSCH may be a DMRS symbol carrying a DMRS or may carry the UCI frequency-division multiplexed with a DMRS, and the second partial PUSCH may include a DMRS. The base station 804 may estimate the channel using the DMRS. Accordingly, the base station 804 may properly receive the UCI in the second partial PUSCH.

In another aspect, the second partial PUSCH may be encoded using the sequence-based encoding based on the codebook at 820. At the UE side, the UE 802 may encode the second partial PUSCH using the sequence-based scheme when the second partial PUSCH does not have a DMRS signal. At the base station side, the base station 804 may decode the second partial PUSCH that does not have a DMRS signal without the channel estimation or the DMRS.

Figure 9:
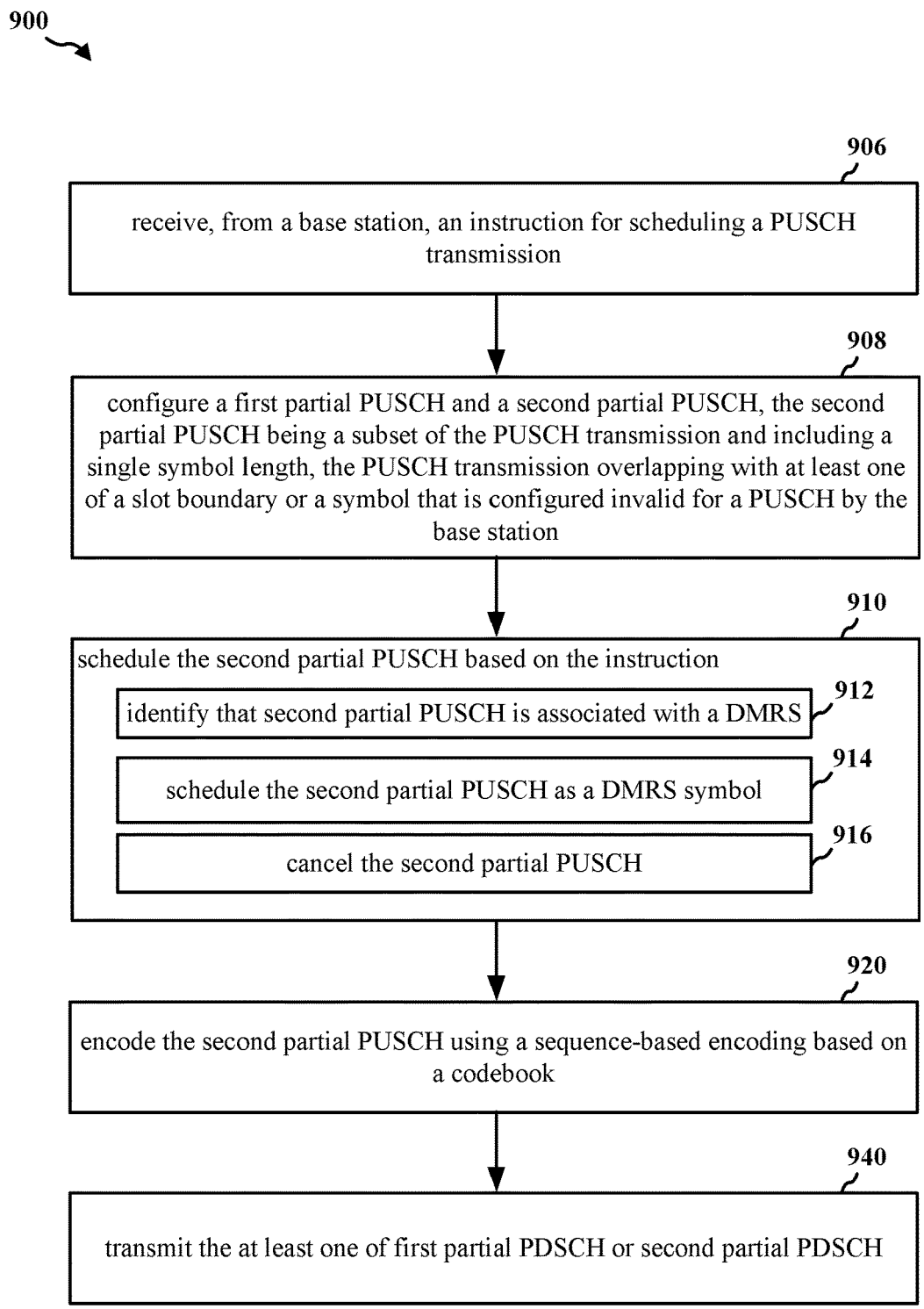
FIG. 9 is a flowchart of a method of wireless communication.

FIG. 9 is a flowchart 900 of a method of wireless communication. The method may be performed by a UE (e.g., the UE 104; the apparatus 1302). The UE may receive, from the base station, an instruction for scheduling a PUSCH transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The UE may schedule the second partial PUSCH based on the instruction received from the base station.

At 906, the UE may receive, from the base station, an instruction for scheduling a PUSCH. The PUSCH transmission may include one or more PUSCH repetitions. The instruction received from the base station may instruct the UE to schedule the second partial PUSCH based on the instruction. The instruction may be received via at least one of an RRC message, a MAC-CE, or DCI. In one aspect, the instruction may indicate the UE to identify whether the second partial PUSCH is within a DMRS bundle at 912, and cancel the second partial PUSCH based on identifying that the second partial PUSCH is not within a DMRS bundle at 916. In another aspect, the instruction may indicate the UE to transmit data via the second partial PUSCH using the sequence-based encoding techniques regardless of whether the second partial PUSCH is within the DMRS bundle. In another aspect, the instruction may indicate the UE to use the second partial PUSCH to send feedback information, e.g., UCI, to the base station. In one aspect, the instruction may configure the UE to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station 804 to estimate an associated UL channel. For example, at 806, the UE 802 may receive, from the base station 804, an instruction for scheduling a PUSCH. Furthermore, 906 may be performed by a partial PUSCH scheduling component 1342.

At 908, the UE may configure a first partial PUSCH and a second partial PUSCH. The second partial PUSCH may be a subset of the PUSCH transmission and include a single symbol length, where the PUSCH transmission overlaps with at least one of a slot boundary or a symbol that is configured invalid for a PUSCH by the base station. For example, at 808, the UE 802 may configure a first partial PUSCH and a second partial PUSCH. Furthermore, 908 may be performed by a partial PUSCH configuration component 1340.

At 910, the UE may schedule the second partial PUSCH based on the instruction received from the base station. 910 may include 912, 914, and 916. At 912, the UE may identify that the second partial PUSCH is associated with the DMRS. At 914, the UE may schedule the second partial PUSCH as a DMRS symbol including the DMRS based on the identification that the second partial PUSCH is associated with the DMRS at 912. That is, the UE may identify that the second partial PUSCH is within a DMRS bundle including at least one DMRS, the UE may schedule the second partial PUSCH as a DMRS symbol including the DMRS. The UE may transmit, to the base station, the second partial PUSCH including the DMRS at 940. The base station may use the DMRS in the second partial PUSCH to estimate the channel. At 916, the UE may cancel the second partial PUSCH based on the identification that the second partial PUSCH not is associated with the DMRS at 912. That is, the UE 802 may identify that the second partial PUSCH is not within a DMRS bundle and does not include at least one DMRS, and the UE may determine to cancel the second partial PUSCH. The base station may identify that the second partial PUSCH is canceled based on the second partial PUSCH not being associated with a DMRS. For example, at 810, the UE 802 may schedule the second partial PUSCH based on the instruction received from the base station 804. At 812, the UE 802 may identify that the second partial PUSCH is associated with the DMRS. At 814, the UE 802 may schedule the second partial PUSCH as a DMRS symbol including the DMRS based on the identification that the second partial PUSCH is associated with the DMRS at 812. At 816, the UE 802 may cancel the second partial PUSCH based on the identification that the second partial PUSCH not is associated with the DMRS at 812. Furthermore, 910, 912, 914, and 916 may be performed by the partial PUSCH scheduling component 1342.

In some aspects, the second partial PUSCH may include at least one feedback information, and the second partial PUSCH may include a UCI. The configuration of the UCI may be received in the instruction received at 906. In one aspect, the second partial PUSCH including the UCI may be encoded using a sequence-based encoding based on a codebook. In another aspect, the UCI of the second partial PUSCH may be frequency-division multiplexed with a DMRS for the base station to perform a phase coherent detection.

The UCI may include at least one of a DL CSI report, an UL CSI report, a request to schedule an UL data transmission, a HARQ-ACK of canceled bits in deferred SPS, or a SRS for the base station to estimate an associated UL channel. In one aspect, the UCI may include one or more DL CSI report, which may include measurement data of DL channels including at least one of a BLER, BER, CQI, channel ranks, etc. over a configured time. In another aspect, the UCI may include one or more UL CSI report. In another aspect, the UCI may include an SRS. In another aspect, the UCI may include a request to schedule an UL data transmission for the UE. In another aspect, the UCI may include a HARQ-ACK of canceled bits in deferred semi-persistent scheduling (SPS). The UCI may further include various interference information such as statistical information, power levels, interference covariance matrix rank and eigenvalues, etc. In yet another aspect, the UCI may include a combination thereof.

In some aspects, the second partial PUSCH may include a DMRS, and the DMRS is one of an FDM DMRS for a CP-OFDM waveform or a TDM DMRS for a DFT-s-OFDM waveform. That is, for transmitting data in the second partial PUSCH including the one-symbol repetition, the UE may be configured to use a FDM DMRS with data in case of a CP-OFDM, or use TDM DMRS with data before DFT in case of DFT-s-OFDM.

At 920, the UE may encode the second partial PUSCH using a sequence-based encoding based on a codebook. That is, the second partial PUSCH may include data, and to transmit the data via the second partial PUSCH, the UE may encode the second partial PUSCH using a sequence-based encoding based on a codebook to transmit the data via the second partial PUSCH at 940. At the UE side, the UE may encode the second partial PUSCH using the sequence-based scheme when the second partial PUSCH does not have a DMRS signal. At the base station side, the base station may decode the second partial PUSCH that does not have a DMRS signal without the channel estimation or the DMRS. The codebook that may be used for the sequence-base encoding and decoding may be agreed upon between the base station and the UE. In one aspect, the codebook for the sequence-base encoding and decoding may be specified in a specification. In another aspect, the base station may transmit a configuration of the codebook for the sequence-base encoding and decoding to the UE. The configuration may be transmitted via at least one of the RRC message, the MAC-CE, or the DCI. For example, at 820, the UE 802 may encode the second partial PUSCH using a sequence-based encoding based on a codebook. Furthermore, 920 may be performed by a partial PUSCH encoding component 1344.

At 940, the UE may transmit, to the base station, at least one of the first partial PUSCH or the second partial PUSCH. For example, at 840, the UE 802 may transmit, to the base station 804, at least one of the first partial PUSCH or the second partial PUSCH. Furthermore, 940 may be performed by a partial PUSCH transmission component 1346.

In one aspect, the second partial PUSCH may be a DMRS symbol carrying a DMRS or may carry the UCI frequency-division multiplexed with a DMRS, and the second partial PUSCH may include a DMRS. The base station may estimate the channel using the DMRS. Accordingly, the base station may properly receive the UCI in the second partial PUSCH.

In another aspect, the second partial PUSCH may be encoded using the sequence-based encoding based on the codebook at 920. At the UE side, the UE may encode the second partial PUSCH using the sequence-based scheme when the second partial PUSCH does not have a DMRS signal. At the base station side, the base station may decode the second partial PUSCH that does not have a DMRS signal without the channel estimation or the DMRS.

Figure 10:
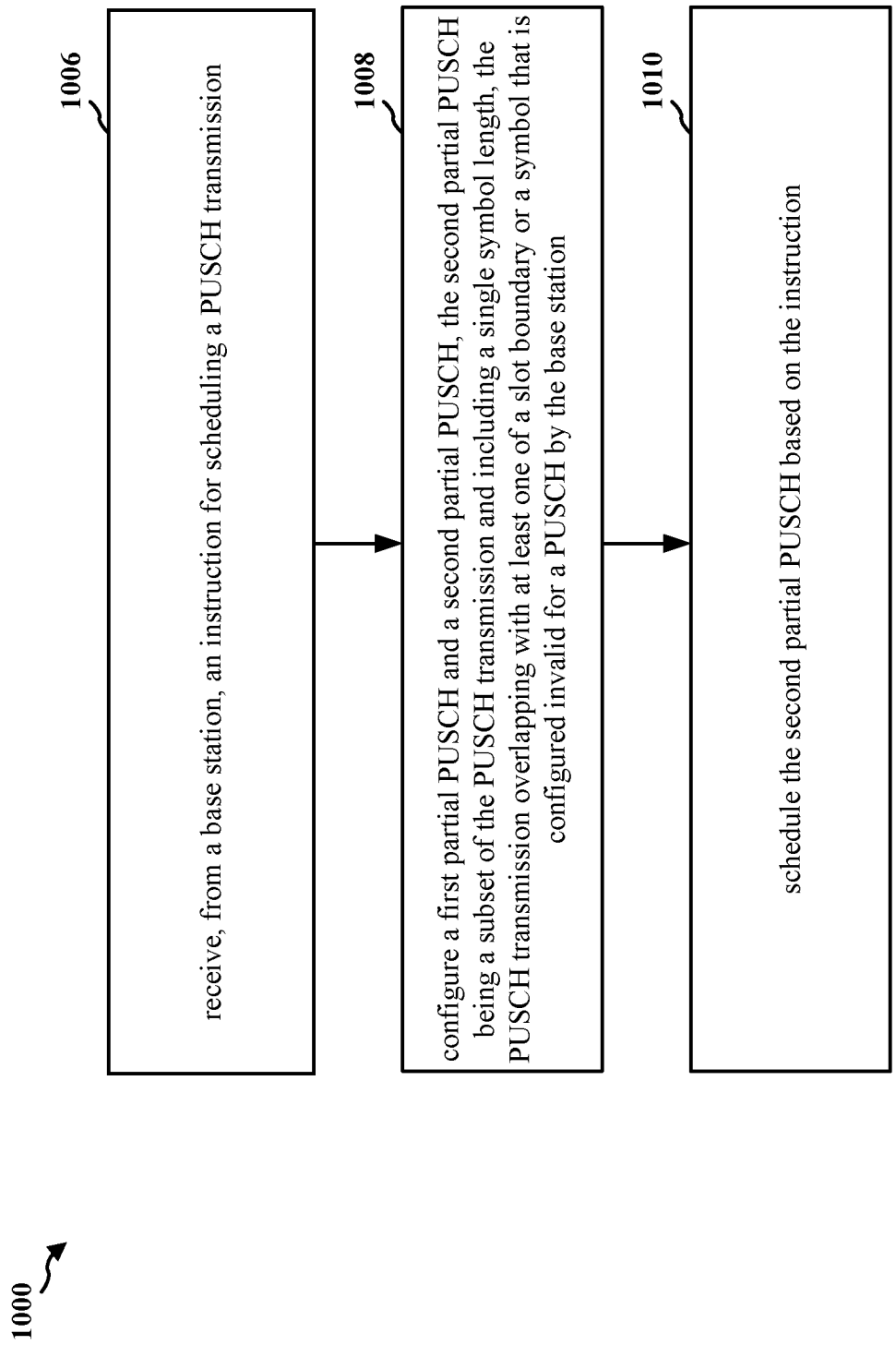
FIG. 10 is a flowchart of a method of wireless communication.

FIG. 10 is a flowchart 1000 of a method of wireless communication. The method may be performed by a UE (e.g., the UE 104; the apparatus 1302). The UE may receive, from the base station, an instruction for scheduling a PUSCH transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The UE may schedule the second partial PUSCH based on the instruction received from the base station.

At 1006, the UE may receive, from the base station, an instruction for scheduling a PUSCH. The PUSCH transmission may include one or more PUSCH repetitions. The instruction received from the base station may instruct the UE to schedule the second partial PUSCH based on the instruction. The instruction may be received via at least one of an RRC message, a MAC-CE, or DCI. In one aspect, the instruction may indicate the UE to identify whether the second partial PUSCH is within a DMRS bundle, and cancel the second partial PUSCH based on identifying that the second partial PUSCH is not within a DMRS bundle. In another aspect, the instruction may indicate the UE to transmit data via the second partial PUSCH using the sequence-based encoding techniques regardless of whether the second partial PUSCH is within the DMRS bundle. In another aspect, the instruction may indicate the UE to use the second partial PUSCH to send feedback information, e.g., UCI, to the base station. In one aspect, the instruction may configure the UE to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station 804 to estimate an associated UL channel. For example, at 806, the UE 802 may receive, from the base station 804, an instruction for scheduling a PUSCH. Furthermore, 1006 may be performed by a partial PUSCH scheduling component 1342.

At 1008, the UE may configure a first partial PUSCH and a second partial PUSCH. The second partial PUSCH may be a subset of the PUSCH transmission and include a single symbol length, where the PUSCH transmission overlaps with at least one of a slot boundary or a symbol that is configured invalid for a PUSCH by the base station. For example, at 808, the UE 802 may configure a first partial PUSCH and a second partial PUSCH. Furthermore, 1008 may be performed by a partial PUSCH configuration component 1340.

At 1010, the UE may schedule the second partial PUSCH based on the instruction received from the base station. In one aspect, the UE may identify that the second partial PUSCH is associated with the DMRS. In another aspect, the UE may schedule the second partial PUSCH as a DMRS symbol including the DMRS based on the identification that the second partial PUSCH is associated with the DMRS. That is, the UE may identify that the second partial PUSCH is within a DMRS bundle including at least one DMRS, the UE may schedule the second partial PUSCH as a DMRS symbol including the DMRS. The UE may transmit, to the base station, the second partial PUSCH including the DMRS. The base station may use the DMRS in the second partial PUSCH to estimate the channel. In another aspect, the UE may cancel the second partial PUSCH based on the identification that the second partial PUSCH not is associated with the DMRS. That is, the UE 802 may identify that the second partial PUSCH is not within a DMRS bundle and does not include at least one DMRS, and the UE may determine to cancel the second partial PUSCH. The base station may identify that the second partial PUSCH is canceled based on the second partial PUSCH not being associated with a DMRS. For example, at 810, the UE 802 may schedule the second partial PUSCH based on the instruction received from the base station 804. At 812, the UE 802 may identify that the second partial PUSCH is associated with the DMRS. At 814, the UE 802 may schedule the second partial PUSCH as a DMRS symbol including the DMRS based on the identification that the second partial PUSCH is associated with the DMRS at 812. At 816, the UE 802 may cancel the second partial PUSCH based on the identification that the second partial PUSCH not is associated with the DMRS at 812. Furthermore, 1010 may be performed by the partial PUSCH scheduling component 1342.

In some aspects, the second partial PUSCH may include at least one feedback information, and the second partial PUSCH may include a UCI. The configuration of the UCI may be received in the instruction received at 1006. In one aspect, the second partial PUSCH including the UCI may be encoded using a sequence-based encoding based on a codebook. In another aspect, the UCI of the second partial PUSCH may be frequency-division multiplexed with a DMRS for the base station to perform a phase coherent detection.

The UCI may include at least one of a DL CSI report, an UL CSI report, a request to schedule an UL data transmission, a HARQ-ACK of canceled bits in deferred SPS, or a SRS for the base station to estimate an associated UL channel. In one aspect, the UCI may include one or more DL CSI report, which may include measurement data of DL channels including at least one of a BLER, BER, CQI, channel ranks, etc. over a configured time. In another aspect, the UCI may include one or more UL CSI report. In another aspect, the UCI may include an SRS. In another aspect, the UCI may include a request to schedule an UL data transmission for the UE. In another aspect, the UCI may include a HARQ-ACK of canceled bits in deferred semi-persistent scheduling (SPS). The UCI may further include various interference information such as statistical information, power levels, interference covariance matrix rank and eigenvalues, etc. In yet another aspect, the UCI may include a combination thereof.

In some aspects, the second partial PUSCH may include a DMRS, and the DMRS is one of an FDM DMRS for a CP-OFDM waveform or a TDM DMRS for a DFT-s-OFDM waveform. That is, for transmitting data in the second partial PUSCH including the one-symbol repetition, the UE may be configured to use a FDM DMRS with data in case of a CP-OFDM, or use TDM DMRS with data before DFT in case of DFT-s-OFDM.

Figure 11:
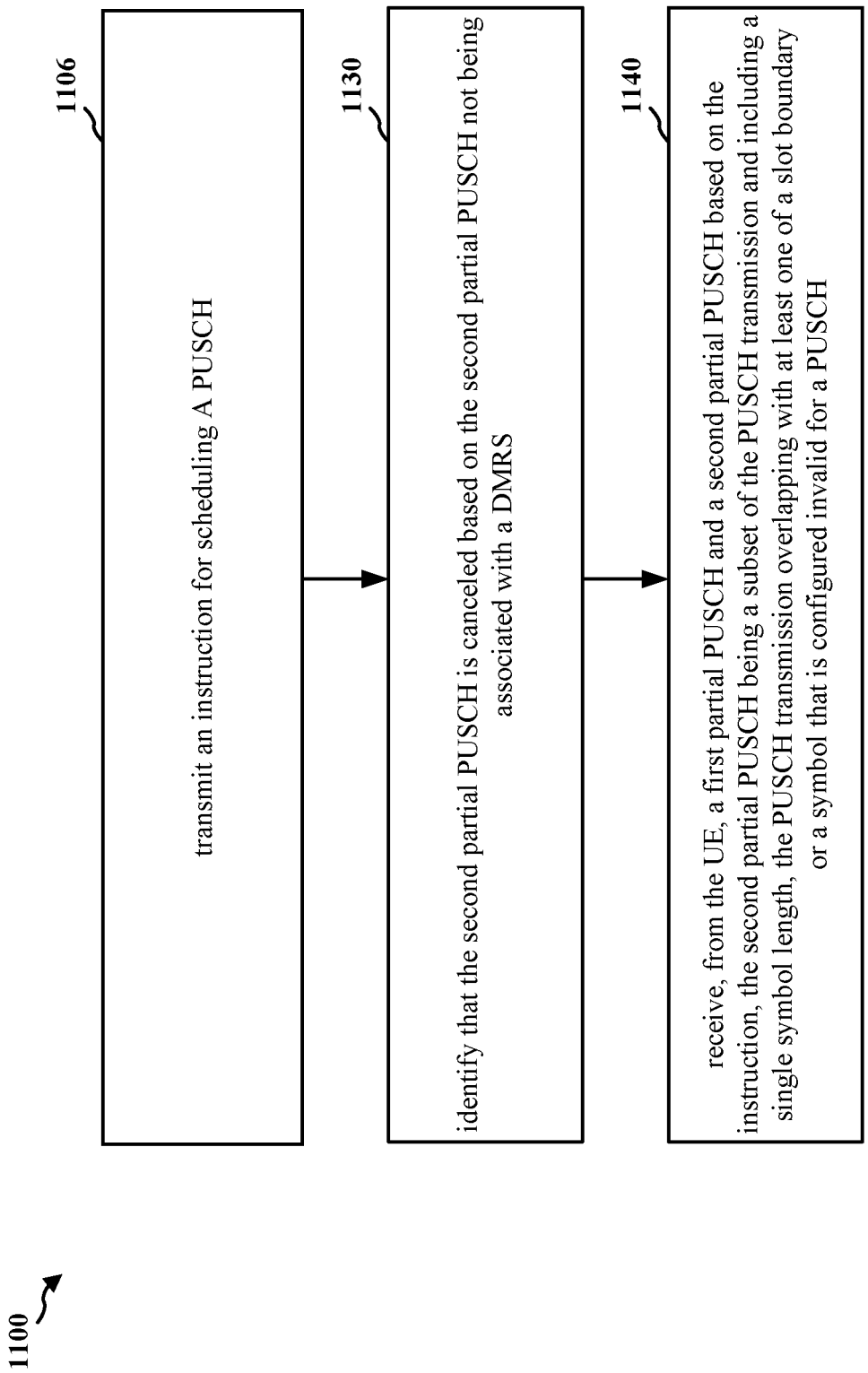
FIG. 11 is a flowchart of a method of wireless communication.

FIG. 11 is a flowchart 1100 of a method of wireless communication. The method may be performed by a base station (e.g., the base station 102/180; the apparatus 1402). The base station may transmit, to a UE, an instruction for scheduling a PUSCH transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The base station may receive, from the UE, the second partial PUSCH based on the instruction transmitted to the UE.

At 1106, the base station may transmit, to the UE, an instruction for scheduling a PUSCH. The PUSCH transmission may include one or more PUSCH repetitions. The instruction received from the base station may instruct the UE to schedule the second partial PUSCH based on the instruction. The instruction may be received via at least one of an RRC message, a MAC-CE, or DCI. In one aspect, the instruction may indicate the UE to identify whether the second partial PUSCH is within a DMRS bundle, and cancel the second partial PUSCH based on identifying that the second partial PUSCH is not within a DMRS bundle. In another aspect, the instruction may indicate the UE to transmit data via the second partial PUSCH using the sequence-based encoding techniques regardless of whether the second partial PUSCH is within the DMRS bundle. In another aspect, the instruction may indicate the UE to use the second partial PUSCH to send feedback information, e.g., UCI, to the base station. In one aspect, the instruction may configure the UE to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station 804 to estimate an associated UL channel. For example, at 806, the base station 804 may transmit, to the UE 802, an instruction for scheduling a PUSCH. Furthermore, 1106 may be performed by a partial PUSCH scheduling component 1442.

At 1130, the base station may identify that the second partial PUSCH is canceled based on the second partial PUSCH not being associated with a DMRS. That is, the base station 804 may identify that the second partial PUSCH is not within a DMRS bundle and does not include at least one DMRS, and the base station 804 may expect the UE 802, at 816, to cancel the second partial PUSCH that is not within the DMRS bundle and does not include at least one DMRS. For example, at 830, the base station 804 may identify that the second partial PUSCH is canceled based on the second partial PUSCH not being associated with a DMRS. Furthermore, 1130 may be performed by the partial PUSCH scheduling component 1442.

At 1140, the base station may receive at least one of the first partial PUSCH and the second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. For example, at 840, the base station 804 may receive at least one of the first partial PUSCH and the second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. Furthermore, 1140 may be performed by a partial PUSCH reception component 1446.

In some aspects, the second partial PUSCH may include at least one feedback information, and the second partial PUSCH may include a UCI. The configuration of the UCI may be received in the instruction received at 1106. In one aspect, the second partial PUSCH including the UCI may be encoded using a sequence-based encoding based on a codebook. In another aspect, the UCI of the second partial PUSCH may be frequency-division multiplexed with a DMRS for the base station to perform a phase coherent detection.

The UCI may include at least one of a DL CSI report, an UL CSI report, a request to schedule an UL data transmission, a HARQ-ACK of canceled bits in deferred SPS, or a SRS for the base station to estimate an associated UL channel. In one aspect, the UCI may include one or more DL CSI report, which may include measurement data of DL channels including at least one of a BLER, BER, CQI, channel ranks, etc. over a configured time. In another aspect, the UCI may include one or more UL CSI report. In another aspect, the UCI may include an SRS. In another aspect, the UCI may include a request to schedule an UL data transmission for the UE. In another aspect, the UCI may include a HARQ-ACK of canceled bits in deferred semi-persistent scheduling (SPS). The UCI may further include various interference information such as statistical information, power levels, interference covariance matrix rank and eigenvalues, etc. In yet another aspect, the UCI may include a combination thereof.

In some aspects, the second partial PUSCH may include a DMRS, and the DMRS is one of an FDM DMRS for a CP-OFDM waveform or a TDM DMRS for a DFT-s-OFDM waveform. That is, for transmitting data in the second partial PUSCH including the one-symbol repetition, the UE may be configured to use a FDM DMRS with data in case of a CP-OFDM, or use TDM DMRS with data before DFT in case of DFT-s-OFDM.

In one aspect, the second partial PUSCH may be a DMRS symbol carrying a DMRS or may carry the UCI frequency-division multiplexed with a DMRS, and the second partial PUSCH may include a DMRS. The base station may estimate the channel using the DMRS. Accordingly, the base station may properly receive the UCI in the second partial PUSCH.

In another aspect, the second partial PUSCH may be encoded using the sequence-based encoding based on the codebook. At the UE side, the UE may encode the second partial PUSCH using the sequence-based scheme when the second partial PUSCH does not have a DMRS signal. At the base station side, the base station may decode the second partial PUSCH that does not have a DMRS signal without the channel estimation or the DMRS.

Figure 12:
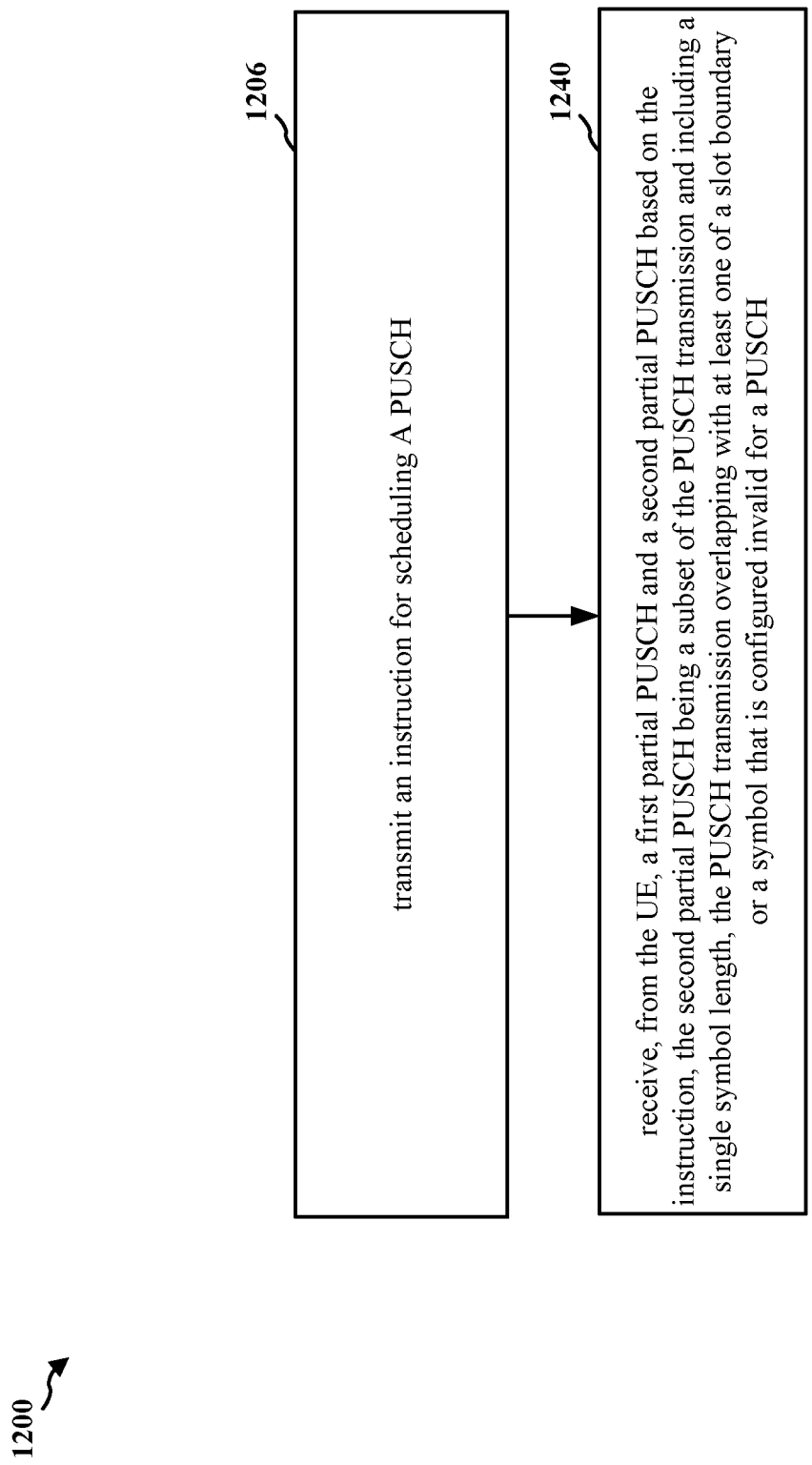
FIG. 12 is a flowchart of a method of wireless communication.

FIG. 12 is a flowchart 1200 of a method of wireless communication. The method may be performed by a base station (e.g., the base station 102/180; the apparatus 1402). The base station may transmit, to a UE, an instruction for scheduling a PUSCH transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The base station may receive, from the UE, the second partial PUSCH based on the instruction transmitted to the UE.

At 1206, the base station may transmit, to the UE, an instruction for scheduling a PUSCH. The PUSCH transmission may include one or more PUSCH repetitions. The instruction received from the base station may instruct the UE to schedule the second partial PUSCH based on the instruction. The instruction may be received via at least one of an RRC message, a MAC-CE, or DCI. In one aspect, the instruction may indicate the UE to identify whether the second partial PUSCH is within a DMRS bundle, and cancel the second partial PUSCH based on identifying that the second partial PUSCH is not within a DMRS bundle. In another aspect, the instruction may indicate the UE to transmit data via the second partial PUSCH using the sequence-based encoding techniques regardless of whether the second partial PUSCH is within the DMRS bundle. In another aspect, the instruction may indicate the UE to use the second partial PUSCH to send feedback information, e.g., UCI, to the base station. In one aspect, the instruction may configure the UE to send the UCI either using a sequence-based encoding or by multiplexing, e.g., FDM, a DMRS with the UCI. In another aspect, the instruction may indicate that the UCI may include at least one of the DL CSI report, the UL CSI report, the request to schedule an UL data transmission, the HARQ-ACK of canceled bits in deferred SPS, or the SRS for the base station 804 to estimate an associated UL channel. For example, at 806, the base station 804 may transmit, to the UE 802, an instruction for scheduling a PUSCH. Furthermore, 1206 may be performed by a partial PUSCH scheduling component 1442.

At 1240, the base station may receive at least one of the first partial PUSCH and the second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. For example, at 840, the base station 804 may receive at least one of the first partial PUSCH and the second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. Furthermore, 1240 may be performed by a partial PUSCH reception component 1446.

In some aspects, the second partial PUSCH may include at least one feedback information, and the second partial PUSCH may include a UCI. The configuration of the UCI may be received in the instruction received at 1206. In one aspect, the second partial PUSCH including the UCI may be encoded using a sequence-based encoding based on a codebook. In another aspect, the UCI of the second partial PUSCH may be frequency-division multiplexed with a DMRS for the base station to perform a phase coherent detection.

The UCI may include at least one of a DL CSI report, an UL CSI report, a request to schedule an UL data transmission, a HARQ-ACK of canceled bits in deferred SPS, or a SRS for the base station to estimate an associated UL channel. In one aspect, the UCI may include one or more DL CSI report, which may include measurement data of DL channels including at least one of a BLER, BER, CQI, channel ranks, etc. over a configured time. In another aspect, the UCI may include one or more UL CSI report. In another aspect, the UCI may include an SRS. In another aspect, the UCI may include a request to schedule an UL data transmission for the UE. In another aspect, the UCI may include a HARQ-ACK of canceled bits in deferred semi-persistent scheduling (SPS). The UCI may further include various interference information such as statistical information, power levels, interference covariance matrix rank and eigenvalues, etc. In yet another aspect, the UCI may include a combination thereof.

In some aspects, the second partial PUSCH may include a DMRS, and the DMRS is one of an FDM DMRS for a CP-OFDM waveform or a TDM DMRS for a DFT-s-OFDM waveform. That is, for transmitting data in the second partial PUSCH including the one-symbol repetition, the UE may be configured to use a FDM DMRS with data in case of a CP-OFDM, or use TDM DMRS with data before DFT in case of DFT-s-OFDM.

In one aspect, the second partial PUSCH may be a DMRS symbol carrying a DMRS or may carry the UCI frequency-division multiplexed with a DMRS, and the second partial PUSCH may include a DMRS. The base station may estimate the channel using the DMRS. Accordingly, the base station may properly receive the UCI in the second partial PUSCH.

In another aspect, the second partial PUSCH may be encoded using the sequence-based encoding based on the codebook. At the UE side, the UE may encode the second partial PUSCH using the sequence-based scheme when the second partial PUSCH does not have a DMRS signal. At the base station side, the base station may decode the second partial PUSCH that does not have a DMRS signal without the channel estimation or the DMRS.

Figure 13:
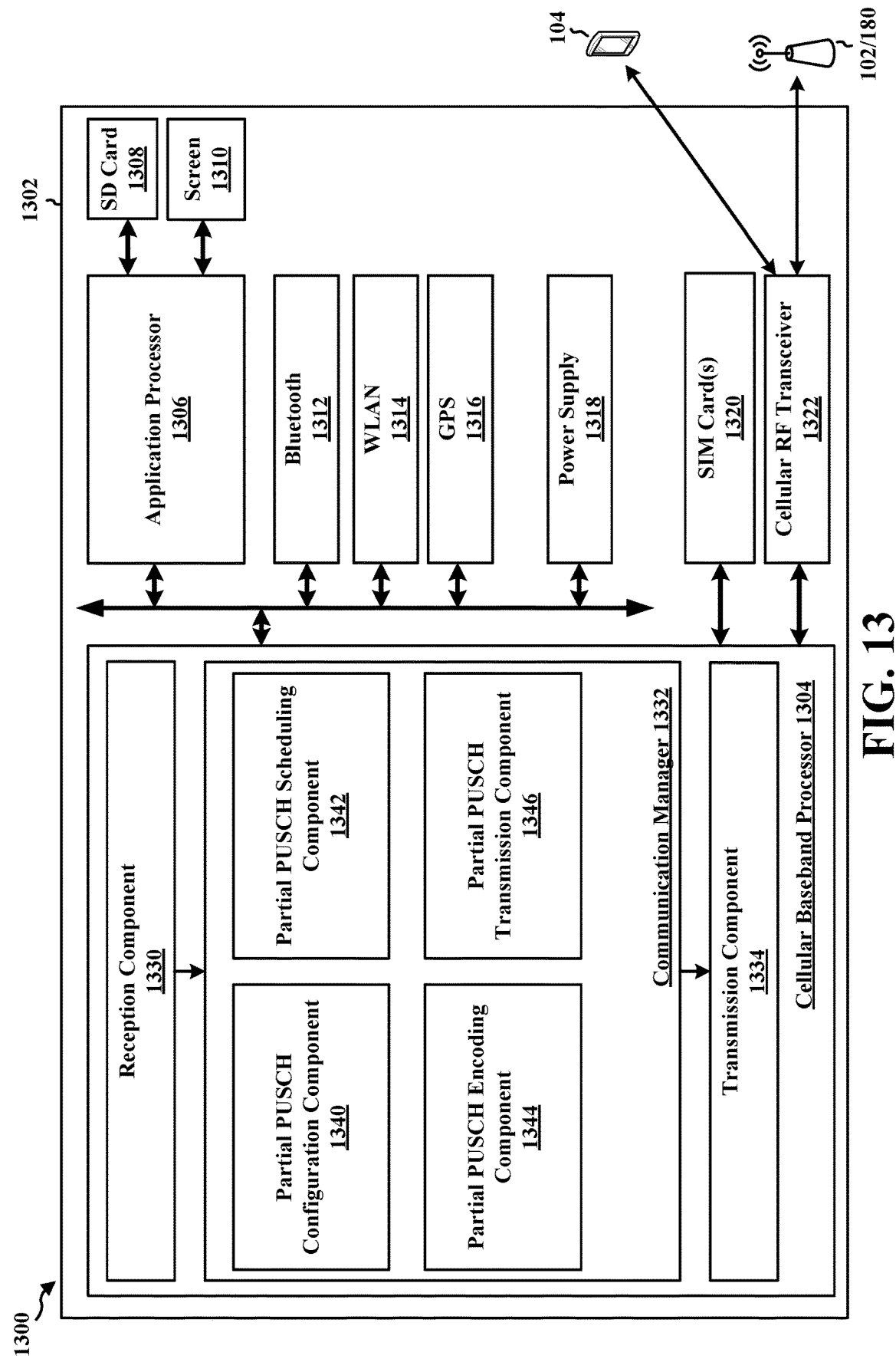
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302. The communication manager 1332 includes a partial PUSCH configuration component 1340 that is configured to configure a first partial PUSCH and a second partial PUSCH, e.g., as described in connection with 908, and 1008. The communication manager 1332 includes a partial PUSCH scheduling component 1342 that is configured to receive, from the base station, an instruction for scheduling a PUSCH, schedule the second partial PUSCH based on the instruction received from the base station, identify that the second partial PUSCH is associated with the DMRS, UE may schedule the second partial PUSCH as a DMRS symbol including the DMRS, and cancel the second partial PUSCH based on the identification that the second partial PUSCH not is associated with the DMRS, e.g., as described in connection with 906, 910, 912, 914, 916, 1006, and 1010. The communication manager 1332 includes a partial PUSCH encoding component 1344 that is configured to encode the second partial PUSCH using a sequence-based encoding based on a codebook, e.g., as described in connection with 920. The communication manager 1332 includes a partial PUSCH transmission component 1346 that is configured to transmit at least one of the first partial PUSCH or the second partial PUSCH, e.g., as described in connection with 940.

The apparatus may include additional components that perform each of the blocks of the algorithm in the flowcharts of FIGS. 8, 9, and 10. As such, each block in the flowcharts of FIGS. 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, an instruction for scheduling a PUSCH transmission, means for configuring a first partial PUSCH and a second partial PUSCH, the second partial PUSCH being a subset of the PUSCH transmission and including a single symbol length, the PUSCH transmission overlapping with at least one of a slot boundary or a symbol that is configured invalid for a PUSCH by the base station, and means for scheduling the second partial PUSCH based on the instruction received from the base station. The apparatus 1302 includes means for identifying that the second partial PUSCH is associated with a DMRS or not associated with the DMRS, means for scheduling the second partial PUSCH as a DMRS symbol including the DMRS, and means for canceling the second partial PUSCH. The apparatus 1302 includes means for encode the second partial PUSCH using a sequence-based encoding based on a codebook. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
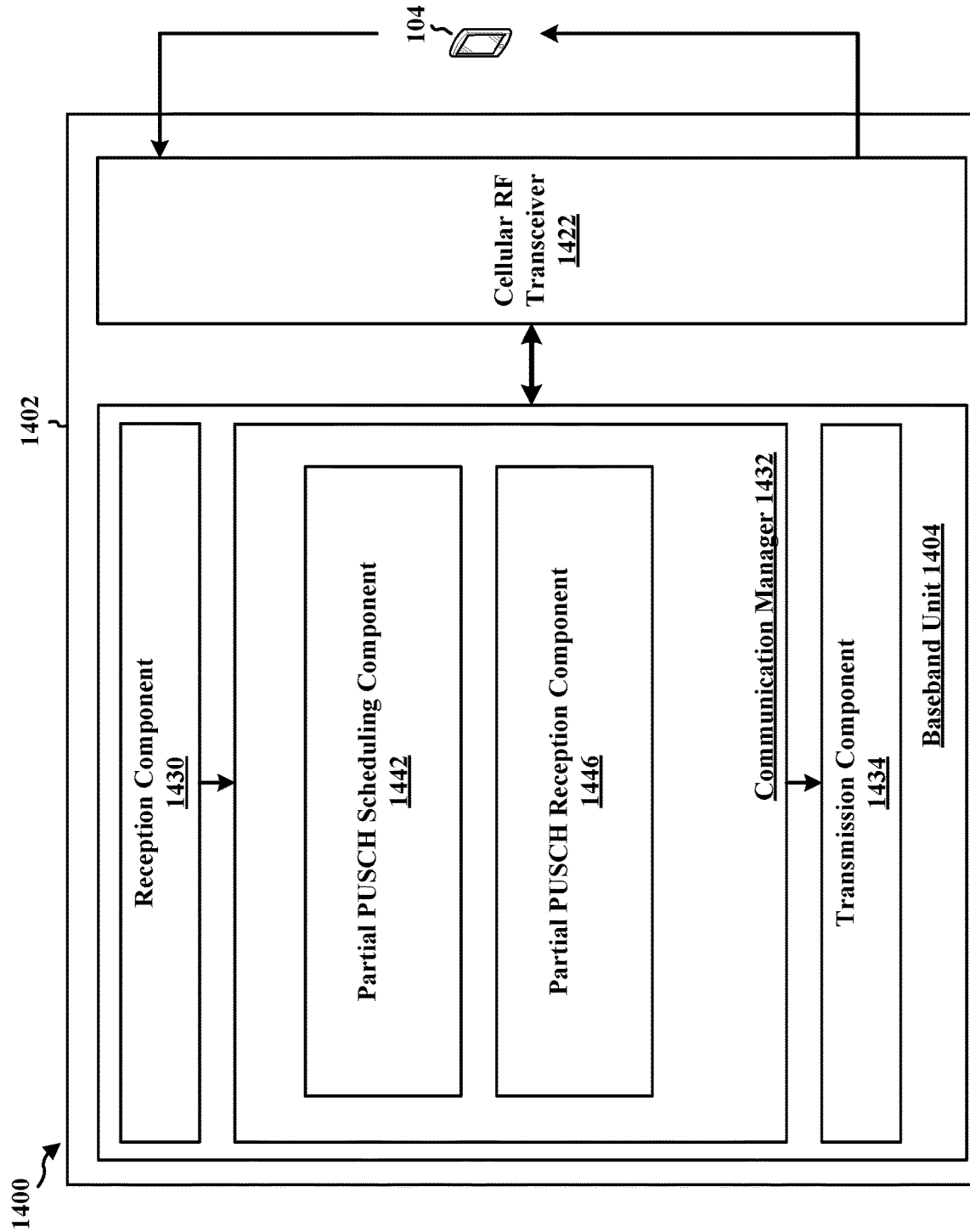
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1302 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a partial PUSCH scheduling component 1442 that is configured to transmit an instruction for scheduling a PUSCH, and identify that the second partial PUSCH is canceled based on the second partial PUSCH not being associated with a DMRS, e.g., as described in connection with 1106, 1130, and 1206. The communication manager 1432 further includes a partial PUSCH reception component 1446 that is configured to receive at least one of the first partial PUSCH and the second partial PUSCH based on the instruction, e.g., as described in connection with 1140 and 1240.

The apparatus may include additional components that perform each of the blocks of the algorithm in the flowcharts of FIGS. 8, 11, and 12. As such, each block in the flowcharts of FIGS. 8, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, an instruction for scheduling a PUSCH transmission, and means for receiving, from the UE, at least one of a first partial PUSCH and a second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH. The apparatus 1402 includes means for identifying that the second partial PUSCH is canceled based on the second partial PUSCH not being associated with a DMRS. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station may transmit, to a UE, an instruction for scheduling a PUSCH transmission. The PUSCH transmission may be overlapping with at least one of a slot boundary or a symbol that is configured invalid for a PUSCH by the base station, and the UE may configure a first partial PUSCH and a second partial PUSCH, the second partial PUSCH being a subset of the PUSCH transmission and including a single symbol length. The UE may schedule the second partial PUSCH based on the instruction received from the base station. The second partial PUSCH within a DMRS bundle may be scheduled for transmission and second partial PUSCH not within the DMRS bundle may be candled. The second partial PUSCH may be scheduled to include UCI including one or more feedback information. The second partial PUSCH may include a DMRS or be include the UCI multiplexed with a DMRS. The second partial PUSCH may be encoded using a sequence-based encoding.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to, based at least in part on information stored in the memory, receive, from a base station, an instruction for scheduling a PUSCH transmission, configure a first partial PUSCH and a second partial PUSCH, the second partial PUSCH being a subset of the PUSCH transmission and including a single symbol length, the PUSCH transmission overlapping with at least one of a slot boundary or a symbol that is configured invalid for a PUSCH by the base station, and schedule the second partial PUSCH based on the instruction received from the base station.

Aspect 2 is the apparatus of aspect 1, where the PUSCH transmission includes one or more PUSCH repetitions.

Aspect 3 is the apparatus of any of aspects 1 and 2, where the instruction is received via at least one of a RRC message, a MAC-CE, or DCI.

Aspect 4 is the apparatus of any of aspects 1 to 3, where, to schedule the second partial PUSCH, the at least one processor is further configured to identify that the second partial PUSCH is associated with a DMRS, and schedule the second partial PUSCH as a DMRS symbol including the DMRS.

Aspect 5 is the apparatus of any of aspects 1 to 4, where, to schedule the second partial PUSCH, the at least one processor is further configured to identify that the second partial PUSCH is not associated with a DMRS, and cancel the second partial PUSCH.

Aspect 6 is the apparatus of any of aspects 1 to 5, where the second partial PUSCH includes data, and the at least one processor is further configured to encode the second partial PUSCH using a sequence-based encoding based on a codebook.

Aspect 7 is the apparatus of any of aspects 1 to 6, where the second partial PUSCH includes UCI.

Aspect 8 is the apparatus of aspect 7, where the instruction includes a configuration of the UCI.

Aspect 9 is the apparatus of any of aspects 7 and 8, where the second partial PUSCH including the UCI is encoded using a sequence-based encoding based on a codebook.

Aspect 10 is the apparatus of any of aspects 7 to 9, where the UCI of the second partial PUSCH is frequency-division multiplexed with a DMRS.

Aspect 11 is the apparatus of any of aspects 8 to 10, where the UCI includes at least one of a DL CSI report, an UL CSI report, a request to schedule an UL data transmission, a HARQ-ACK of canceled bits in deferred SPS, or a SRS for the base station to estimate an associated UL channel.

Aspect 12 is the apparatus of aspect 11, where the instruction indicates at least one of the DL CSI report, the UL CSI report, the request to schedule the UL data transmission, the HARQ-ACK of the canceled bits in the deferred SPS, or the SRS.

Aspect 13 is the apparatus of any of aspects 1 to 5, 7, 8, and 10-12, where the second partial PUSCH includes a DMRS, and the DMRS is one of a FDM DMRS for a CP-OFDM waveform or a TDM DMRS for a DFT-s-OFDM waveform.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is an apparatus for wireless communication at a base station including at least one processor coupled to a memory and configured to, based at least in part on information stored in the memory, transmit, to a UE, an instruction for scheduling a PUSCH transmission, and receive, from the UE, at least one of a first partial PUSCH and a second partial PUSCH based on the instruction, the second partial PUSCH being a subset of the PUSCH transmission and including a single symbol length, the PUSCH transmission overlapping with at least one of a slot boundary or a symbol that is configured invalid for a PUSCH.

Aspect 18 is the apparatus of aspect 17, where the PUSCH transmission includes one or more PUSCH repetitions.

Aspect 19 is the apparatus of any of aspects 17 and 18, where the PUSCH transmission includes one or more PUSCH repetitions.

Aspect 20 is the apparatus of any of aspects 17 to 19, where the instruction is transmitted via at least one of a RRC message, a MAC-CE, or DCI.

Aspect 21 is the apparatus of any of aspects 17 to 20, where the at least one processor is further configured to identify that the second partial PUSCH is canceled based on the second partial PUSCH not being associated with a DMRS.

Aspect 22 is the apparatus of any of aspects 17 to 21, where the second partial PUSCH includes data, and the second partial PUSCH is encoded using a sequence-based encoding based on a codebook.

Aspect 23 is the apparatus of any of aspects 17 to 22, where the second partial PUSCH includes UCI.

Aspect 24 is the apparatus of aspect 23, where the instruction includes a configuration of the UCI.

Aspect 25 is the apparatus of any of aspects 23 to 24, where the second partial PUSCH including the UCI is encoded using a sequence-based encoding based on a codebook.

Aspect 26 is the apparatus of any of aspects 23 to 25, where the UCI of the second partial PUSCH is frequency-division multiplexed with a DMRS.

Aspect 27 is the apparatus of any of aspects 23 to 26 where the UCI includes at least one of a DL CSI report, an UL CSI report, a request to schedule an UL data transmission, a HARQ-ACK of canceled bits in deferred SPS, or a SRS for the base station to estimate an associated UL channel.

Aspect 28 is the apparatus of aspect 27, where the instruction indicates at least one of the DL CSI report, the UL CSI report, the request to schedule the UL data transmission, the HARQ-ACK of the canceled bits in the deferred SPS, or the SRS.

Aspect 29 is the apparatus of any of aspects 17 to 21, 23, 24, and 26 to 28, where the second partial PUSCH includes a DMRS, and the DMRS is one of a FDM DMRS for a CP-OFDM waveform or a TDM DMRS for a DFT-s-OFDM waveform.

Aspect 30 is a method of wireless communication for implementing any of aspects 17 to 29.

Aspect 31 is an apparatus for wireless communication including means for implementing any of aspects 17 to 29.

Aspect 32 is a computer-readable medium storing computer executable code, where the code when executed by a processor causes the processor to implement any of aspects 17 to 29.

What is claimed is:

1. An apparatus for wireless communication at a user equipment (UE), comprising:
   memory; and
   at least one processor coupled to the memory and configured to, based at least in part on information stored in the memory:
      receive, from a base station, an instruction for scheduling a physical uplink shared channel (PUSCH) transmission;
      configure a first partial PUSCH and a second partial PUSCH, the second partial PUSCH being a subset of the PUSCH transmission and including a single symbol length, the PUSCH transmission overlapping with at least one of a slot boundary that is between the first partial PUSCH and the second partial PUSCH or a symbol that is configured invalid for a PUSCH by the base station; and
      schedule the second partial PUSCH based on the instruction received from the base station.

2. The apparatus of claim 1, wherein the PUSCH transmission includes one or more PUSCH repetitions.

3. The apparatus of claim 1, wherein to receive the instruction, the at least one processor is configured to receive the instruction via at least one of a radio resource control (RRC) message, a medium access control (MAC) control element (CE) (MAC-CE), or downlink control information (DCI).

4. The apparatus of claim 1, wherein, to schedule the second partial PUSCH, the at least one processor is further configured to:
   identify that the second partial PUSCH is associated with a demodulation reference signal (DMRS); and
   schedule the second partial PUSCH as a DMRS symbol including the DMRS.

5. The apparatus of claim 1, wherein, to schedule the second partial PUSCH, the at least one processor is further configured to:
   identify that the second partial PUSCH is not associated with a demodulation reference signal (DMRS); and
   cancel the second partial PUSCH.

6. The apparatus of claim 1, wherein the second partial PUSCH includes data, and the at least one processor is further configured to:

encode the second partial PUSCH using a sequence-based encoding based on a codebook.

7. The apparatus of claim 1, wherein the second partial PUSCH includes uplink control information (UCI).

8. The apparatus of claim 7, wherein the instruction includes a configuration of the UCI.

9. The apparatus of claim 7, wherein to encode the second partial PUSCH including the UCI, the at least one processor is configured to encode the second partial PUSCH including the UCI using a sequence-based encoding based on a codebook.

10. The apparatus of claim 7, wherein the UCI of the second partial PUSCH is frequency-division multiplexed with a demodulation reference signal (DMRS).

11. The apparatus of claim 7, wherein the UCI includes at least one of a downlink (DL) channel state information (CSI) report, an uplink (UL) CSI report, a request to schedule an UL data transmission, a hybrid automatic repeat request (HARQ) acknowledgement (ACK) (HARQ-ACK) of canceled bits in deferred semi-persistent scheduling (SPS), or a sounding reference signal (SRS) for the base station to estimate an associated UL channel.

12. The apparatus of claim 11, wherein the instruction indicates at least one of the DL CSI report, the UL CSI report, the request to schedule the UL data transmission, the HARQ-ACK of the canceled bits in the deferred SPS, or the SRS.

13. The apparatus of claim 1, wherein the second partial PUSCH includes a demodulation reference signal (DMRS), and the DMRS is one of a frequency-division multiplex (FDM) DMRS for a cyclic prefix (CP) orthogonal frequency division multiplexing (OFDM) (CP-OFDM) waveform or a time-division multiplex (TDM) DMRS for a discrete Fourier transform-spread-Orthogonal Frequency Division Multiplexing (DFT-s-OFDM) waveform.

14. The apparatus of claim 1, further comprising a transceiver coupled to the at least one processor.

15. An apparatus for wireless communication at a base station, comprising:
memory; and
at least one processor coupled to the memory and configured to, based at least in part on information stored in the memory:
transmit, to a user equipment (UE), an instruction for scheduling a physical uplink shared channel (PUSCH) transmission; and
receive, from the UE, at least one of a first partial PUSCH and a second partial PUSCH based on the instruction, the second partial PUSCH being a subset of the PUSCH transmission and including a single symbol length, the PUSCH transmission overlapping with at least one of a slot boundary that is between the first partial PUSCH and the second partial PUSCH or a symbol that is configured invalid for a PUSCH.

16. The apparatus of claim 15, wherein the PUSCH transmission includes one or more PUSCH repetitions.

17. The apparatus of claim 15, wherein to transmit the instruction, the at least one processor is configured to transmit the instruction via at least one of a radio resource control (RRC) message, a medium access control (MAC) control element (CE) (MAC-CE), or downlink control information (DCI).

18. The apparatus of claim 15, wherein the second partial PUSCH is associated with a demodulation reference signal (DMRS), and the second partial PUSCH is scheduled as a DMRS symbol including the DMRS.

19. The apparatus of claim 15, wherein the at least one processor is further configured to:
identify that the second partial PUSCH is canceled based on the second partial PUSCH not being associated with a demodulation reference signal (DMRS).

20. The apparatus of claim 15, wherein the second partial PUSCH includes data, and the second partial PUSCH is encoded using a sequence-based encoding based on a codebook.

21. The apparatus of claim 15, wherein the second partial PUSCH includes uplink control information (UCI).

22. The apparatus of claim 21, wherein the instruction includes a configuration of the UCI.

23. The apparatus of claim 21, wherein the second partial PUSCH including the UCI is encoded using a sequence-based encoding based on a codebook.

24. The apparatus of claim 21, wherein the UCI of the second partial PUSCH is frequency-division multiplexed with a demodulation reference signal (DMRS).

25. The apparatus of claim 21, wherein the UCI includes at least one of a downlink (DL) channel state information (CSI) report, an uplink (UL) CSI report, a request to schedule an UL data transmission, a hybrid automatic repeat request (HARQ) acknowledgement (ACK) (HARQ-ACK) of canceled bits in deferred semi-persistent scheduling (SPS), or a sounding reference signal (SRS) for the base station to estimate an associated UL channel.

26. The apparatus of claim 25, wherein the instruction indicates at least one of the DL CSI report, the UL CSI report, the request to schedule the UL data transmission, the HARQ-ACK of the canceled bits in the deferred SPS, or the SRS.

27. The apparatus of claim 15, wherein the second partial PUSCH includes a demodulation reference signal (DMRS), and the DMRS is one of a frequency-division multiplex (FDM) DMRS for a cyclic prefix (CP) orthogonal frequency division multiplexing (OFDM) (CP-OFDM) waveform or a time-division multiplex (TDM) DMRS for a discrete Fourier transform-spread-Orthogonal Frequency Division Multiplexing (DFT-s-OFDM) waveform.

28. The apparatus of claim 15, further comprising a transceiver coupled to the at least one processor.

29. A method of wireless communication at a user equipment (UE), comprising:
receiving, from a base station, an instruction for scheduling a physical uplink shared channel (PUSCH) transmission;
configuring a first partial PUSCH and a second partial PUSCH, the second partial PUSCH being a subset of the PUSCH transmission and including a single symbol length, the PUSCH transmission overlapping with at least one of a slot boundary that is between the first partial PUSCH and the second partial PUSCH or a symbol that is configured invalid for a PUSCH by the base station; and
scheduling the second partial PUSCH based on the instruction received from the base station.

30. A method of wireless communication at a base station, comprising:
transmitting, to a user equipment (UE), an instruction for scheduling a physical uplink shared channel (PUSCH) transmission; and
receiving, from the UE, at least one of a first partial PUSCH and a second partial PUSCH based on the instruction, the second partial PUSCH being a subset of the PUSCH transmission and including a single symbol length, the PUSCH transmission overlapping with at least one of a slot boundary that is between the first partial PUSCH and the second partial PUSCH or a symbol that is configured invalid for a PUSCH.

\* \* \* \* \*